US012058754B2

United States Patent
Cheng et al.

(10) Patent No.: US 12,058,754 B2
(45) Date of Patent: Aug. 6, 2024

(54) NR BLIND RESUME

(71) Applicant: Qualcomm Incorporated, San Diego, CA (US)

(72) Inventors: Peng Cheng, Beijing (CN); Huichun Liu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 223 days.

(21) Appl. No.: 17/431,205

(22) PCT Filed: Mar. 29, 2019

(86) PCT No.: PCT/CN2019/080441
§ 371 (c)(1),
(2) Date: Aug. 16, 2021

(87) PCT Pub. No.: WO2020/198941
PCT Pub. Date: Oct. 8, 2020

(65) Prior Publication Data
US 2022/0117022 A1    Apr. 14, 2022

(51) Int. Cl.
*H04W 76/16*    (2018.01)
*H04W 12/03*    (2021.01)
(Continued)

(52) U.S. Cl.
CPC ........... *H04W 76/16* (2018.02); *H04W 12/03* (2021.01); *H04W 12/041* (2021.01); *H04W 76/19* (2018.02)

(58) Field of Classification Search
CPC ... H04W 76/19; H04W 76/16; H04W 12/041; H04W 76/15; H04W 76/27; H04W 12/03; H04W 76/30; H04W 24/10
See application file for complete search history.

(56) References Cited

U.S. PATENT DOCUMENTS

2015/0215929 A1    7/2015  Damnjanovic et al.
2020/0267631 A1*   8/2020  Yilmaz ................. H04W 48/16
(Continued)

FOREIGN PATENT DOCUMENTS

CN    103765943 A    4/2014
CN    105940651 A    9/2016
(Continued)

OTHER PUBLICATIONS

International Search Report and Written Opinion—PCT/CN2019/080441—ISA/EPO—dated Dec. 31, 2019.

*Primary Examiner* — Brian D Nguyen
(74) *Attorney, Agent, or Firm* — Holland & Hart LLP

(57) ABSTRACT

Methods, systems, and devices for wireless communications are described. A user equipment (UE) in a dual connectivity configuration with a master node and a secondary node may support blind resume for secondary node communications. For example, a master node may use radio resource control (RRC) signaling to indicate multiple secondary cell group (SCG) configurations to a UE for blind resume. The UE may support both UE based and network based blind resume techniques based on the indicated SCG configurations. Network based blind resume may include the network indicating to the UE which SCG configuration to use for resuming communications. The UE based blind resume may include the UE conducting measurements on a set of stored SCG configurations to determine which SCG configuration to use for resuming communications and applying the SCG configuration before receiving a resume indication from the base station.

34 Claims, 19 Drawing Sheets

(51) Int. Cl.
*H04W 12/041* (2021.01)
*H04W 76/19* (2018.01)

(56) References Cited

U.S. PATENT DOCUMENTS

| | | | |
|---|---|---|---|
| 2021/0392538 A1* | 12/2021 | Wang | H04B 7/15528 |
| 2022/0053390 A1* | 2/2022 | Kim | H04W 36/00 |
| 2022/0078646 A1* | 3/2022 | Xu | H04W 76/15 |
| 2023/0040003 A1* | 2/2023 | Kim | H04W 76/18 |
| 2023/0164871 A1* | 5/2023 | Jung | H04W 12/0433 |
| | | | 370/328 |
| 2023/0171776 A1* | 6/2023 | Dinan | H04W 72/0453 |
| | | | 370/336 |

FOREIGN PATENT DOCUMENTS

| | | |
|---|---|---|
| WO | WO-2015116353 A1 | 8/2015 |
| WO | WO-2019027296 A1 | 2/2019 |

* cited by examiner

NR BLIND RESUME

CROSS REFERENCE TO RELATED APPLICATION

The present U.S. 371 application for patent claims priority to International Patent Application No. PCT/CN2019/080441 by Cheng et al., entitled "NR BLIND RESUME," filed Mar. 29, 2019, which is assigned to the assignee hereof, and which is expressly incorporated by reference in its entirety herein.

BACKGROUND

The following relates generally to wireless communications, and more specifically to New Radio (NR) blind resume.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

A wireless multiple-access communications system may include a number of base stations or network access nodes, each simultaneously supporting communication for multiple communication devices, which may be otherwise known as user equipment (UE). A UE may be configured to simultaneously connect to and communicate with a network using multiple nodes, such as in a dual connectivity (DC) configuration with a master node (e.g., including a primary or serving cell, and zero or more secondary cells) and a secondary node (e.g., including one or more secondary cells). Techniques utilized by a UE and the network for resuming communications with one or more nodes in a DC configuration may be slow and inefficient, or otherwise problematic.

SUMMARY

The described techniques relate to improved methods, systems, devices, and apparatuses that support NR blind resume. The described techniques relate to improved methods, systems, devices, and apparatuses that support blindly resuming communications based on a secondary cell group (SCG) configuration in a dual connectivity (DC) configuration. One such configuration is in multi-radio access technology-dual connectivity (MR-DC). Generally, the described techniques provide for a user equipment (UE) operating in a DC configuration with a master node (MN) and a secondary node (SN) to determine which SCG configuration to use to resume communications with the SN after the UE is in an inactive communications state with the SN. The blind resumption of communications with an SN may be conducted through a UE based blind resume or a network based blind resume. In the case of UE based blind resume, the UE may conduct measurements on secondary cells of the SN using a set of stored SCG configurations. The set of SCG configurations may have been indicated to the UE by the MN, for example in a suspend message from the MN, the suspend message instructing the UE to enter an inactive state with the SN. Based on the measurements, the UE may determine an SCG configuration to use for the resumption of communications with the SN. The UE may apply the determined SCG configuration and transmit an indication of the applied SCG configuration to the network. Based on the indication, the network may determine to activate the SN for communications with the UE based on the applied SCG indicated by the UE, or may indicate to the UE a different SCG configuration to use for resuming communications.

In the case of network based blind resume, the UE may optionally conduct measurements on secondary cells of the SN using a set of stored SCG configurations. The set of SCG configuration may have been indicated to the UE by the MN in a suspend message from the MN, the suspend message instructing the UE to enter an inactive state with the SN. Based on the measurements, the UE may select an SCG configuration to use for the resumption of communications with the SN, and may convey the selected SCG configuration to the network. The network may determine to activate the SN for communications with the UE based on the selected SCG, or may determine an alternative SCG configuration. The alternative SCG configuration may be one of the stored SCG configurations or may be a different SCG configuration separate from the stored SCG configurations to use to resume communications. In some cases, the network may not provide an indication of an SCG configuration that the UE is to use for resuming communications. In such instances, the UE may perform a random access procedure to reestablish communications with the secondary node.

A method of wireless communications at a UE in a dual connectivity configuration with a master node and a secondary node is described. The method may include receiving a message from the master node instructing the UE to enter an inactive state, the message including an indication of a set of secondary cell group configurations for the UE, determining, by the UE in the inactive state, to resume communications with the secondary node, determining, based on the determination to resume communications and the indication of the set of secondary cell group configurations, a secondary cell group configuration for communications with the secondary node, and communicating with the secondary node based on the secondary cell group configuration.

An apparatus for wireless communications at a UE in a dual connectivity configuration with a master node and a secondary node is described. The apparatus may include a processor, memory in electronic communication with the processor, and instructions stored in the memory. The instructions may be executable by the processor to cause the apparatus to receive a message from the master node instructing the UE to enter an inactive state, the message including an indication of a set of secondary cell group configurations for the UE, determine, by the UE in the inactive state, to resume communications with the secondary node, determine, based on the determination to resume communications and the indication of the set of secondary cell group configurations, a secondary cell group configuration for communications with the secondary node, and communicate with the secondary node based on the secondary cell group configuration.

Another apparatus for wireless communications at a UE in a dual connectivity configuration with a master node and a secondary node is described. The apparatus may include means for receiving a message from the master node instructing the UE to enter an inactive state, the message including an indication of a set of secondary cell group configurations for the UE, determining, by the UE in the inactive state, to resume communications with the secondary node, determining, based on the determination to resume communications and the indication of the set of secondary cell group configurations, a secondary cell group configuration for communications with the secondary node, and communicating with the secondary node based on the secondary cell group configuration.

A non-transitory computer-readable medium storing code for wireless communications at a UE in a dual connectivity configuration with a master node and a secondary node is described. The code may include instructions executable by a processor to receive a message from the master node instructing the UE to enter an inactive state, the message including an indication of a set of secondary cell group configurations for the UE, determine, by the UE in the inactive state, to resume communications with the secondary node, determine, based on the determination to resume communications and the indication of the set of secondary cell group configurations, a secondary cell group configuration for communications with the secondary node, and communicate with the secondary node based on the secondary cell group configuration.

Some examples of the method, apparatuses, and non-transitory computer-readable medium described herein may further include operations, features, means, or instructions for receiving, from the master node, an indication of the secondary cell group configuration to use to resume communications with the secondary node, the secondary cell group configuration determined based on the received indication of the secondary cell group configuration, and applying the indicated secondary cell group configuration to communicate with the secondary node.

Some examples of the method, apparatuses, and non-transitory computer-readable medium described herein may further include operations, features, means, or instructions for selecting an initial secondary cell group configuration from the set of secondary cell group configurations, and transmitting, to the master node, an indication of the initial secondary cell group configuration, the indication of the secondary cell group configuration received from the master node in response to the transmitted indication of the initial secondary cell group configuration.

In some examples of the method, apparatuses, and non-transitory computer-readable medium described herein, the indication of the secondary cell group configuration may be ciphered based on a security key generated using a Next Hop Chaining Counter (NCC) included in the message from the master node instructing the UE to enter the inactive state.

Some examples of the method, apparatuses, and non-transitory computer-readable medium described herein may further include operations, features, means, or instructions for receiving an indication to resume communications with the secondary node using the secondary cell group configuration via a RRC message, where the RRC message includes a secondary cell state associated with the secondary cell group configuration.

In some examples of the method, apparatuses, and non-transitory computer-readable medium described herein, the secondary cell state includes one of activated, deactivated, or dormant.

In some examples of the method, apparatuses, and non-transitory computer-readable medium described herein, the message from the master node instructing the UE to enter the inactive state includes a RRC release message.

In some examples of the method, apparatuses, and non-transitory computer-readable medium described herein, the message from the master node instructing the UE to enter the inactive state includes a NCC.

In some examples of the method, apparatuses, and non-transitory computer-readable medium described herein, the message from the master node instructing the UE to enter the inactive state includes a reference signal received power threshold, a reference signal received quality threshold, or a combination thereof, for use by the UE to validate secondary cell group configurations upon resuming communications.

Some examples of the method, apparatuses, and non-transitory computer-readable medium described herein may further include operations, features, means, or instructions for selecting, by the UE, an initial secondary cell group configuration from the set of secondary cell group configurations, applying the initial secondary cell group configuration selected by the UE to communicate with the secondary node, and transmitting, to the master node after applying the initial secondary cell group configuration, an indication of the initial secondary cell group configuration selected by the UE.

Some examples of the method, apparatuses, and non-transitory computer-readable medium described herein may further include operations, features, means, or instructions for receiving, from the master node, an indication of the secondary cell group configuration to use to resume communications with the secondary node, where the secondary cell group configuration may be a different configuration than the initial secondary cell group configuration, and configuring the UE according to the indicated secondary cell group configuration different than the initial secondary cell group configuration.

Some examples of the method, apparatuses, and non-transitory computer-readable medium described herein may further include operations, features, means, or instructions for receiving, from the master node, an indication of the secondary cell group configuration to use to resume communications with the secondary node, where the secondary cell group configuration may be a same configuration as the initial secondary cell group configuration.

Some examples of the method, apparatuses, and non-transitory computer-readable medium described herein may further include operations, features, means, or instructions for receiving, based on the secondary cell group configuration being the same configuration as the initial secondary cell group configuration, data for the UE together with the indication of the secondary cell group configuration.

In some examples of the method, apparatuses, and non-transitory computer-readable medium described herein, the indication to resume communications with the secondary node using the secondary cell group configuration may be received via a RRC message that includes data for the UE.

In some examples of the method, apparatuses, and non-transitory computer-readable medium described herein, the indication of the secondary cell group configuration may be ciphered with a security key generated based on a NCC included in the message from the master node instructing the UE to enter the inactive state.

Some examples of the method, apparatuses, and non-transitory computer-readable medium described herein may further include operations, features, means, or instructions for measuring, based on the set of secondary cell group configurations, signaling from at least one secondary node after determining to resume communications with the secondary node, the secondary cell group configuration determined based on the measuring.

Some examples of the method, apparatuses, and non-transitory computer-readable medium described herein may further include operations, features, means, or instructions for measuring a reference signal received power, a reference signal received quality, or a combination thereof, of the signaling.

Some examples of the method, apparatuses, and non-transitory computer-readable medium described herein may further include operations, features, means, or instructions for storing a set of higher layer secondary cell group configurations and a corresponding set of lower layer secondary cell group configurations based on the set of secondary cell group configurations.

Some examples of the method, apparatuses, and non-transitory computer-readable medium described herein may further include operations, features, means, or instructions for discarding the set of secondary cell group configurations based on the secondary cell group configuration being different than all secondary cell group configurations of the set of secondary cell group configurations.

Some examples of the method, apparatuses, and non-transitory computer-readable medium described herein may further include operations, features, means, or instructions for performing a random access procedure with the secondary based on the determined secondary cell group configuration, where communicating with the secondary node may be based on the performed random access procedure.

A method of wireless communications at a master node in a dual connectivity configuration with a UE and a secondary node is described. The method may include transmitting a message to the UE instructing the UE to enter an inactive state, the message including an indication of a set of secondary cell group configurations for the UE, determining that the UE is to resume communications with the secondary node, determining, based on the determination to resume communications and the set of secondary cell group configurations, a secondary cell group configuration for communications between the UE and the secondary node, and transmitting, to the UE, an indication to resume communications with the secondary node using the secondary cell group configuration.

An apparatus for wireless communications at a master node in a dual connectivity configuration with a UE and a secondary node is described. The apparatus may include a processor, memory in electronic communication with the processor, and instructions stored in the memory. The instructions may be executable by the processor to cause the apparatus to transmit a message to the UE instructing the UE to enter an inactive state, the message including an indication of a set of secondary cell group configurations for the UE, determine that the UE is to resume communications with the secondary node, determine, based on the determination to resume communications and the set of secondary cell group configurations, a secondary cell group configuration for communications between the UE and the secondary node, and transmit, to the UE, an indication to resume communications with the secondary node using the secondary cell group configuration.

Another apparatus for wireless communications at a master node in a dual connectivity configuration with a UE and a secondary node is described. The apparatus may include means for transmitting a message to the UE instructing the UE to enter an inactive state, the message including an indication of a set of secondary cell group configurations for the UE, determining that the UE is to resume communications with the secondary node, determining, based on the determination to resume communications and the set of secondary cell group configurations, a secondary cell group configuration for communications between the UE and the secondary node, and transmitting, to the UE, an indication to resume communications with the secondary node using the secondary cell group configuration.

A non-transitory computer-readable medium storing code for wireless communications at a master node in a dual connectivity configuration with a UE and a secondary node is described. The code may include instructions executable by a processor to transmit a message to the UE instructing the UE to enter an inactive state, the message including an indication of a set of secondary cell group configurations for the UE, determine that the UE is to resume communications with the secondary node, determine, based on the determination to resume communications and the set of secondary cell group configurations, a secondary cell group configuration for communications between the UE and the secondary node, and transmit, to the UE, an indication to resume communications with the secondary node using the secondary cell group configuration.

Some examples of the method, apparatuses, and non-transitory computer-readable medium described herein may further include operations, features, means, or instructions for receiving, from the UE, an indication of a selected secondary cell group configuration for the UE, the indication of the selected secondary cell group configuration received in response to the transmitted indication of the set of secondary cell group configurations for the UE.

In some examples of the method, apparatuses, and non-transitory computer-readable medium described herein, the indication of the selected secondary cell group configuration may be ciphered with a security key generated based on a NCC included in the message to the UE instructing the UE to enter the inactive state.

In some examples of the method, apparatuses, and non-transitory computer-readable medium described herein, the message transmitted to the UE instructing the UE to enter the inactive state includes a RRC release message.

In some examples of the method, apparatuses, and non-transitory computer-readable medium described herein, the message transmitted to the UE instructing the UE to enter the inactive state includes a NCC and the indication to resume communications may be ciphered with a security key generated based on the NCC.

In some examples of the method, apparatuses, and non-transitory computer-readable medium described herein, the message transmitted to the UE instructing the UE to enter the inactive state includes a reference signal received power threshold, a reference signal received quality threshold, or a combination thereof, for use by the UE to validate secondary cell group configurations upon resuming communications.

Some examples of the method, apparatuses, and non-transitory computer-readable medium described herein may further include operations, features, means, or instructions for transmitting the indication to resume communications with the secondary node using the secondary cell group configuration via a RRC message, where the RRC message includes a secondary cell state associated with the secondary cell group configuration.

In some examples of the method, apparatuses, and non-transitory computer-readable medium described herein, the secondary cell state includes one of activated, deactivated, or dormant.

Some examples of the method, apparatuses, and non-transitory computer-readable medium described herein may further include operations, features, means, or instructions for receiving, from the UE, an indication of a selected secondary cell group configuration applied by the UE.

In some examples of the method, apparatuses, and non-transitory computer-readable medium described herein, the indication of the selected secondary cell group configuration applied by the UE may be ciphered based on a security key generated using a NCC included in the message to the UE instructing the UE to enter the inactive state.

Some examples of the method, apparatuses, and non-transitory computer-readable medium described herein may further include operations, features, means, or instructions for transmitting, to the UE, an indication of the secondary cell group configuration to use to resume communications with the secondary node, where the secondary cell group configuration may be a different configuration than the selected secondary cell group configuration.

Some examples of the method, apparatuses, and non-transitory computer-readable medium described herein may further include operations, features, means, or instructions for transmitting, to the UE, an indication of the secondary cell group configuration to use to resume communications with the secondary node, where the secondary cell group configuration may be a same configuration as the selected secondary cell group configuration.

Some examples of the method, apparatuses, and non-transitory computer-readable medium described herein may further include operations, features, means, or instructions for transmitting, based on the secondary cell group configuration being the same configuration as the selected secondary cell group configuration, data for the UE together with the indication of the secondary cell group configuration.

DETAILED DESCRIPTION

Figure 1:
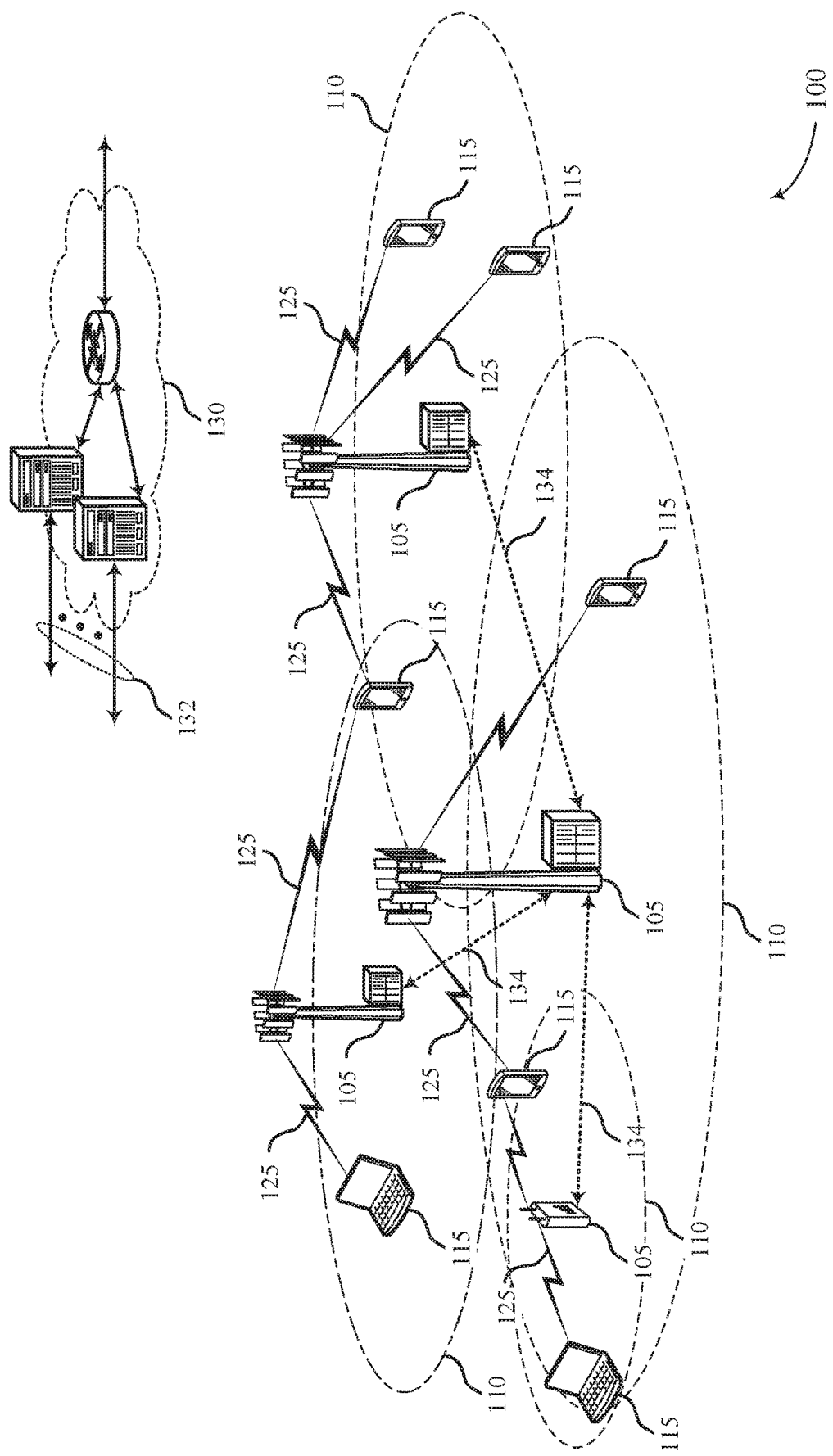
FIG. 1 illustrates an example of a wireless communications system that supports New Radio (NR) blind resume in accordance with aspects of the present disclosure.

In some wireless communications systems, a user equipment (UE) may communicate with a network using dual connectivity (DC). In such cases, the UE may simultaneously communicate with different base stations and/or different transmission reception points (TRPs), where a first base station may provide at least a first cell (e.g., a primary cell and zero or more second cells) and be referred to as a master node (MN). A second base station providing at least a second cell (e.g., one or more secondary cells) of the DC deployment may be referred to as a secondary node (SN). The first and second cells (and the MN and SN) may each operate according to the same radio access technology (RAT) or different RATs. As such, various DC deployments may be referred to as evolved universal terrestrial radio access (E-UTRA) new radio (NR)-dual connectivity (EN-DC), NR E-UTRA-DC (NE-DC), NR NR-DC, Long Term Evolution (LTE) LTE-DC, or may include other types of multi-radio access technology-dual connectivity (MR-DC) deployments based on the RAT implemented by each cell. In any case, the different cells a UE communicates on for DC may use the same or different radio frequency (RF) spectrum bands.

In some cases, a UE may not be continuously communicating with one or more base stations, and the UE may accordingly operate in various communication states (e.g., to save power when not transmitting or receiving data). For instance, the UE may operate in an idle communication state (e.g., a radio resource control (RRC) idle state), where the UE may be "on standby" and thus, may not be assigned to a particular serving base station. Additionally, the UE may operate in a connected communication state (e.g., an RRC connected state) where the UE may be "active" and transmit data to/receive data from a serving cell. The UE may accordingly transition from the RRC idle state to the RRC connected state, and vice versa, based on its activity.

In some systems, a UE may support additional communication states. For example, an inactive communication state (e.g., an RRC inactive state) between the connected communication state and the idle communication state may be used to enable transitions from the inactive communication state to the connected communication state with reduced latency (e.g., as compared to the transition from the idle communication state to the connected communication state). When transitioning to the inactive communication state, a UE context (e.g., an access stratum (AS) context) may be retained at the UE and the network (e.g., radio access network (RAN)), and both the UE and network may further store higher-layer configurations (e.g., for respective cells of DC/carrier aggregation (CA) deployments) while simultaneously releasing lower-layer configurations (as the lower-layer configurations may change, for example, due to the UE's mobility). In some cases, lower-layer configurations for respective cells or cell groups may also be stored. When resuming communications with the network and moving out of the inactive communication state, the UE may apply the stored higher-layer and/or lower-layer configurations.

In some cases, due to the release of the lower-layer configurations, the UE may not be able to operate using the previously-established DC and/or CA schemes immediately after leaving the inactive communication state. Techniques utilized by a UE and the network for resuming communications with one or more nodes in a DC configuration may involve the transmission of several messages (e.g., in a random access procedure) or the measurement of multiple signals or beams, which may introduce latency and lead to inefficient resumption of communications. For example, a UE in a DC deployment that enters the inactive communication state may later require multiple reconfiguration messages to obtain a full configuration, including the lower-layer configurations for different cells (and any updates thereto), to establish communication with multiple nodes of the DC deployment. Additionally, the UE may be asked to perform and transmit one or more measurement reports to reestablish communications with a previous cell of the DC scheme or establish connections with a new cell according to the DC scheme. Further, the full lower-layer configurations for each cell may need to be signaled from the network. Such signaling overhead and measurement reporting may reduce efficiency in the system and may cause unnecessary delays in configuring a UE for CA/DC communications.

As described herein, techniques for receiving, storing, and maintaining, at a UE, SCG configurations that may include both lower-layer and higher-layer configurations, for example, may reduce latency and signaling overhead when the UE leaves the inactive communication state. For instance, the UE and network may use a blind resume technique to establish communications with a SCG of the DC scheme. The blind resume technique may be based on a UE based blind resume, or a network based blind resume, or both, for example in different situations or at different times.

An SCG configuration may include a PSCell and one or more SCells. SCell configurations may include a cell-common part and a UE-dedicated part. Additionally, an SCell configuration may indicate configuration information for a set of SCG configurations and a set of MCG configurations. The SCG configuration may also include certain parameters and information. For example, an SCG configuration may include at least one of an identifier for the SN of the SCG configuration, parameters for the SN communications, or configuration information for one or more cells of the SCG. The SCG configuration may also include a downlink configuration, containing downlink frequency information (e.g., FrequencyInfoDL), where the information may include a number of different parameters for transmission and reception, including carrier and band list, point A, and absolute radio-frequency channel number (ARFCN).

The SCG configuration structure may also include a number of timing parameters and timing offset parameters (e.g., nTimingAdvanceOffset), and may include a number of synchronization signal block (SSB) positions, periodicity, and power information relevant to the SCell. The SCG configuration structure may further include several rate matching components, such as a NR rate matching component and a cell specific reference signal (CRS) rate match component, which may include a number of subcomponents including downlink carrier frequency components, bandwidth information, CRS ports, v-shift components, a multi-broadcast single frequency network (MBSFN) list, and so on, which may further aid communications. The SCG configuration structure may additionally include a common time division duplexing (TDD) component used in both uplink and downlink communication, and may use a single frequency band and an alternating slotted scheduling structure. The configuration may further include an uplink configuration or a supplementary uplink configuration containing uplink frequency information (e.g., FrequencyInfoUL) which may include a number of different parameters for transmission and reception, including carrier and band list, point A, and emission, p-Max, and 7p5 kHz shift components. The uplink or supplementary uplink configuration may additionally include an uplink BWP, for example an initial uplink BWP. The SCG configuration structure may further contain a secondary component carrier (SCC) or multiple SCCs which may in some examples be used in conjunction with a primary component carrier (PCC) established for the network. The SCG configuration structure may additionally include a downlink modulation reference signal (DMRS) and associated mapping type (e.g., type A mapping).

In both the case of UE based blind resume and network based blind resume, the process may include the storage of candidate SCG configurations by the UE. For instance, before entering an inactive state with the master node or secondary node in a DC connectivity configuration, the UE may receive a suspend message from the MN that indicates or includes a set of SCG configurations for the UE. The UE may store the set of SCG configurations and enter an inactive state. In some cases, the UE may determine to resume communications with the SN based on the set of SCG configurations. In such instances, the UE may conduct measurements on the set of stored candidate SCG configurations, select an initial SCG configuration based on the measurements, and optionally transmit an indication of the selected initial SCG configuration to the network (e.g., via the MN).

In the case of network based blind resume, the UE may transmit a selected SCG configuration to the network (e.g., to the MN of MCG). The network or MN may determine whether to accept the SCG configuration selected by the UE or to choose a different SCG configuration. In either case, the network may transmit to the UE an indication of the selected SCG configuration. The UE may then resume communications and transmit data to and from the network over the determined SCG configuration.

In the case of UE based blind resume, the UE may conduct measurements on each of the candidate SCG configurations. In this case, the UE may preemptively apply the selected SCG configuration before transmitting and indication of the selected SCG configuration to the network. After applying the SCG configuration, the UE may transmit an indication to the network of the selected and preemptively applied SCG configuration. The network may determine whether to maintain the UE-selected SCG configuration or to select a different SCG configuration. If the network maintains the UE-selected SCG configuration, the network may send an indication to the UE of the approval. If the network chooses to select a different SCG configuration, the network may transmit a rejection of the UE-selected SCG configuration and may also transmit a different SCG configuration for the UE may use to resume communications, which the UE may then apply. Based on the indication from the network, the UE may resume communications and transmit and receive data with the SN in accordance with the determined applied SCG configuration.

The use of UE and network based blind resume may reduce signaling overhead and time used to fully configure one or more cells for a UE. The described techniques may accordingly be applicable for DC configurations (e.g., NE-DC, EN-DC, and the like) and CA configurations when the UE resumes from an inactive communication state. Additionally or alternatively, the described techniques may be applicable to scenarios where a UE is connected to a single base station, and may be used to efficiently set up DC or CA when the UE resumes communications from the inactive communication state.

Aspects of the disclosure are initially described in the context of a wireless communications systems. Aspects are then described with respect to process flows. Aspects of the disclosure are further illustrated by and described with reference to apparatus diagrams, system diagrams, and flowcharts that relate to NR blind resume.

FIG. 1 illustrates an example of a wireless communications system 100 that supports NR blind resume in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that may make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with component carrier (CCs) operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), TDD, or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected CCs using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a CA configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as CA or multi-carrier operation. A UE 115 may be configured with multiple downlink CCs and one or more uplink CCs according to a CA configuration. CA may be used with both FDD and TDD CCs.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a CA configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCS, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Wireless communications system 100 may support blindly resuming communications based on an SCG configuration in multi-radio access technology-dual connectivity (MR-DC). For example, a UE 115 may operate in a DC configuration with a base station that supports communications over a primary cell (e.g., acting as a MN in the DC configuration) and over a secondary cell (e.g., acting as an SN in the DC configuration). In some cases, a first base station 105 may act as the MN and a second different base station 105 may act as the SN. In some cases, UE 115 may be in an inactive communications state with the SN and may utilize a UE-based blind resume technique in which the UE 115 determines and applies an SCG configuration of a set of SCG configurations indicated to the UE 115 from the MN (e.g., in a suspend message before entering the inactive state). The UE 115 may transmit an indication of the applied SCG configuration to the base station 105 acting as an MN and based on the indication, the MN may determine to activate the SN for communications with the UE 115 using the applied SCG, or may determine a different SCG configuration for the UE 115 to use for resuming communications with the SN.

In a network-based blind resume, the UE 115 may optionally select an SCG configuration of a set of SCG configurations with which to use for the resumption of communications with the SN and convey the selected SCG configuration to the MN. The MN may determine to activate SN communications with the UE 115 based on the selected SCG, or may determine an alternative SCG configuration for the UE 115 to use for resuming communications. In some cases, the MN may not provide an indication of an SCG configuration that the UE 115 is to use for resuming communications and in such instances, the UE 115 may perform a random access procedure to reestablish communications with the secondary node.

Figure 2:
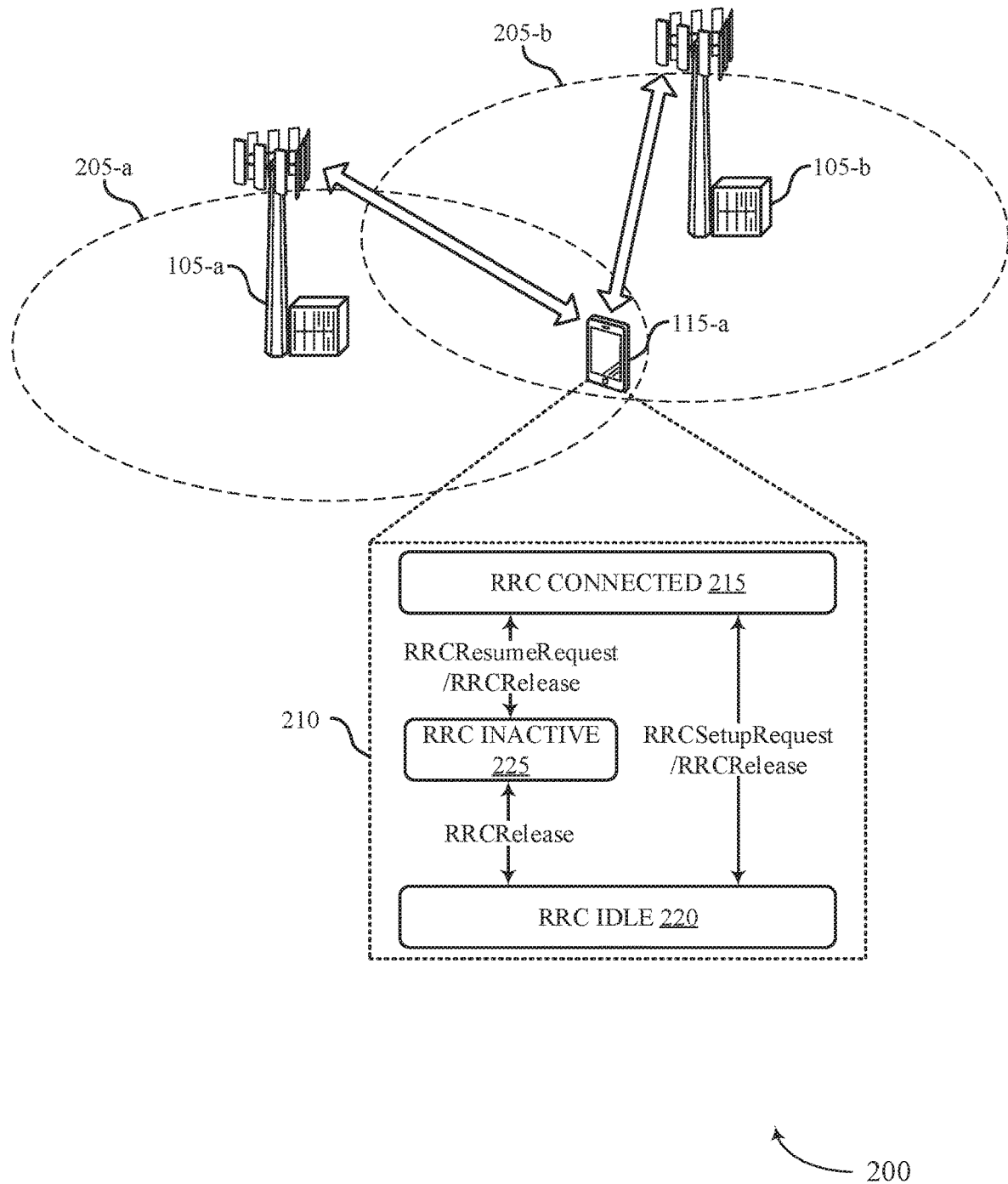
FIG. 2 illustrates an example of a wireless communications system that supports NR blind resume in accordance with aspects of the present disclosure.

FIG. 2 illustrates an example of a wireless communications system 200 that supports NR blind resume in accordance with aspects of the present disclosure. In some examples, wireless communications system 200 may implement aspects of wireless communications system 100. For example, wireless communications system 200 includes a first base station 105-a, a second base station 105-b, and a UE 115-a, which may be examples of the corresponding devices described with reference to FIG. 1. Wireless communications system 200 may support the use of techniques that enhance the resumption of communications in CA and DC deployments after UE 115-a leaves an RRC inactive state.

In wireless communications system 200, a UE 115-a may communicate with a network using a DC configuration. In such cases, UE 115-a may simultaneously communicate with different base stations 105 (e.g., first base station 105-a and second base station 105-b). First base station 105-a may provide coverage to a first cell 205-a and first base station 105-a may be referred to as an MN. The first cell 205-a may correspond to a PCell in the DC deployment. Additionally, second base station 105-b may provide coverage to a second cell 205-b of the DC configuration, and second base station 105-b may be referred to as an SN. In some cases, the second cell 205-b may correspond to a secondary cell (e.g., an SCell or PSCell) in the DC deployment. Additional SCells may be used by each base station 105, where cells associated with the MN may belong to a master cell group (MCG) and cells associated with the SN may belong to an SCG.

In some cases, each of the cells 205 of the DC deployment may be associated with a same or different RAT. For instance, first base station 105-a and second base station 105-b may communicate using a first RAT and a second RAT, respectively. The first RAT and/or the second RAT may include, for example, LTE, NR, or another RAT. As such, various DC deployments may sometimes be referred to as EN-DC, NE-DC, NR NR-DC, LTE LTE-DC, enhanced LTE (eLTE) eLTE-DC, or may include other types of MR-DC deployments based on the RAT that is used by each base station 105. In any case, the different cells of a DC deployment may use the same or different RF spectrum bands for communication with UE 115-a.

In some cases, DC deployments may use different radio bearers for transmitted messages for each cell. For instance, first base station 105-a may be configured as a MN and may provide a set of serving cells that correspond to an MCG. First base station 105-a may use a first set of signaling radio bearers (SRBs) (e.g., SRB1, SRB2) to transport messages for the MCG, such as RRC messages. Additionally, second base station 105-b may be configured as an SN and may provide another set of serving cells that correspond to an SCG, and second base station 105-b may use a second set of SRBs (e.g., SRB3) to transport messages for the SCG. In some examples, a split bearer configuration may be supported, where a particular protocol layer (e.g., a PDCP layer) for both the MN and SN may be used to route data streams to/from UE 115-a. Here, an SRB (e.g., SRB1/SRB2) may be split between the MN and the SN, and downlink messages sent from the MN to UE 115-a may be sent via lower layers (RLC, MAC, PHY, etc.) of either the MN or the SN. In other cases, downlink messages may be sent via the lower layers of both the master and SNs. In the uplink, RRC messages from UE 115-a may be transmitted to the MN via the SN using the split bearer (e.g., via a "leg" associated with the SN). For the signaling of data in the user plane, respective data radio bearers (DRBs) may be used by the MCG and SCG.

UE 115-a may also communicate with a single base station 105 (e.g., first base station 105-a) using multiple carriers (e.g., CCs, which may also be referred to as layers, channels, etc.). In such cases, a CC may refer to each of the carriers used by UE 115-a in CA operations. Further, a serving cell of first base station 105-a may correspond to each CC used in CA operation, where each serving cell may be different (e.g., based on the path loss experienced by different CCs on different RF spectrum bands). In some examples, one carrier may be designated as a primary carrier, or primary CC (PCC), for UE 115-a, which may be served by a PCell. Additional carriers may be designated as secondary carriers, or secondary CCs (SCCs), which may be served by SCells of first base station 105-a. CA operations may use the same or different RF bands for communications.

In wireless communications system 200, UE 115-a may operate in different RRC states when communicating with one or more of the base stations 105. For instance, and as illustrated by state diagram 210, UE 115-a may operate in an RRC connected state 215 (e.g., RRC CONNECTED) where UE 115-a may be "active" and transmit data to/receive data from a serving cell. Additionally, UE 115-a may operate in an RRC idle state 220 (e.g., RRC IDLE), in which case UE 115-a may be "on standby" and thus, may not be assigned to a particular serving base station 105. In the RRC idle state 220, radio bearers for the system may be released (e.g., to avoid re-routing should UE 115-a move to another cell), but UE 115-a may still perform various functions, such as cell reselection and discontinuous reception (DRX) for paging messages, among other functions. UE 115-a may accordingly transition from the RRC idle state 220 to the RRC connected state 215, and vice versa, based on its activity. When transitioning to the RRC connected state 215 from the RRC idle state 220, UE 115-a may transmit, to a base station 105, a setup request message (e.g., RRCSetupRequest). Alternatively, when transitioning from the RRC connected state 215 to the RRC idle state 220, UE 115-a may receive a release message (e.g., RRCRelease).

In wireless communications system 200, UE 115-a may support an RRC state in addition to idle and connected (active) states. For example, an RRC inactive state 225 between the RRC connected state 215 and the RRC idle state 220 may be used to enable a faster transition to the RRC connected state 215 (e.g., as compared to the transition from the RRC idle state 220 to the RRC connected state 215). When UE 115-a is in the RRC inactive state 225, it may receive system information, perform cell measurements, and perform other functions. UE 115-a may transition to the RRC connected state 215 from the RRC inactive state 225 when downlink data is available for UE 115-a, or UE 115-a has uplink data to transmit, or both, and UE 115-a may accordingly transmit a resume request message (e.g., RRCResumeRequest) to resume communications with a base station 105. When transitioning from the RRC connected state 215 to the RRC inactive state 225, UE 115-a may receive a release message (e.g., RRCRelease) from a base station 105. Likewise, when moving from the RRC inactive state 225 to the RRC idle state 220, UE 115-a may receive a release message from the base station 105.

When entering into the RRC inactive state 225, a UE context (e.g., an access stratum (AS) context) may be retained at UE 115-a and the network, and both UE 115-a and the network may store higher-layer configurations (e.g., for a DC/CA deployment) while simultaneously releasing lower-layer configurations (as the lower-layer configurations may change, for example, due to UE 115-a being mobile (i.e., non-stationary)). More specifically, UE 115-a, first base station 105-a (e.g., providing the MCG), and second base station 105-b (e.g., providing the SCG) may store PDCP/SDAP configurations (e.g., for both MCG and SCG) when UE 115-a transitions to the RRC inactive state 225. Additionally, UE 115-a may release lower-layer configurations for both the MCG and SCG when in the RRC inactive state 225. Then, when resuming communications with either first base station 105-a or second base station 105-b when moving out of the RRC inactive state 225 to the RRC connected state 215, UE 115-a may apply the determined upper-layer (PDCP and/or SDAP) configurations of the MCG and SCG.

Without the use of measurement reports, the UE 115-a may be able to resume the stored SCG configuration by using a UE based or a network based blind resume.

In some aspects with respect to wireless communications system 200, when UE 115-a receives the release message (e.g., RRCRelease message) to transition to the RRC idle state 220, the release message may further include an indication for UE 115-a to suspend communications (e.g., suspendconfig) with second base station 105-b (e.g., SCG, SN, etc.). The release message may include multiple candidate SCG configurations. In some cases, the multiple candidate SCG configurations may be a number of possible SCG configurations for the last SN. For example, the release message may include N number of candidate SCG configurations for a single SN (e.g., the last SN). The multiple different candidate SCG configurations for the last SN may include group based common SCell configurations. The group based common SCell configurations may therefore reduce signaling overhead because the common SCell configurations may be applicable to multiple SCell groups, but may all be included in the same message.

In other cases, the multiple candidate SCG configuration may be SCG configurations for a number of different candidate SNs. For example, the release message may include N number of SCG configurations for N number of candidate SNs. This set of candidate SCG configurations may also be a group based common SCell configuration, which may also reduce signaling overhead.

In either case of the release message including multiple candidate SCG configurations for the last serving SN or multiple candidate SCG configurations for a number of multiple candidate SNs, UE 115-a may store the multiple candidate SCG configurations. The storage of the multiple candidate SCG configurations may also include both the higher layer and the lower layer configuration of the SCGs.

After being in the RRC inactive state 225, UE 115-a may perform a random access channel (RACH) procedure to re-enter the RRC connected state 215 (e.g., with second base station 105-b). For example, UE 115-a may first transmit a Msg1 of a four-step RACH procedure, as described herein, to first base station 105-a to initiate the RACH procedure. After receiving a Msg2 (e.g., random access response (RAR) message), UE 115-a may measure signaling on the stored lower-layer SCG configuration (e.g., one or more of reference signal received power (RSRP), reference signal received quality (RSRQ), received signal strength indicator (RSSI), signal to interference plus noise ratio (SINR), etc.). Though reference may be made to RSRP and RSRQ, other types of suitable measurements may be made for the SCG configurations.

In some cases, the release message may also include a threshold value for the measured signaling (e.g., RSRP or RSRQ thresholds). The threshold RSRP or RSRQ may be used by UE 115-a to validate the SN/SCG when UE 115-a resumes communications with base stations 105. The release message may also include NCC. For example, UE 115-a may perform measurements on the candidate SCG configurations in order to determine a preferred SCG configuration. The preferred SCG configuration may be determined based on the RSRP/RSRQ measurement threshold UE 115-a may determine a preferred SCG configuration by conducting RSRP and/or RSRQ measurements on the set of candidate SCG configurations received in the release message. UE 115-*a* may select a preferred SCG configuration based on taking the same measurements for the candidate SCG configurations. UE 115-*a* may select a preferred SCG configuration based on a determine of which SCG configurations meets the determined RSRP/RSRQ threshold, or by determining which SCG configuration exceeds the threshold more than other SCG configurations.

Subsequently, in Msg3 of the RACH procedure, UE 115-*a* may indicate to base station 105-*a* of either the selected initial SCG configuration (in the case of network based blind resume) or UE 115-*a* may indicate to the base station 105-*a* of the selected and preemptively applied initial SCG configuration (in the case of UE based blind resume).

In network based blind resume, UE 115-*a* may receive a fourth message that may be a resume message (e.g., RRCResume message). The resume message may include an indication of which SCG configuration of the set of SCG configurations that UE 115-*a* may use to resume communications on, which may be determined by the network or the MN or the MCG. The resume message may also include an indication of the SCell status for each configured SCell in the MCG and the SCG. The SCell status (e.g., SCellState) may be one of deactivated, activated, or dormant. The indication of the SCell status may also apply to NR-CA. UE 115-*a* may resume with the network-indicated SCG configuration after the reception of a resume message from the network or MN.

In UE based blind resume, UE 115-*a* may proactively restore and resume based on its best stored SCG configuration. This may occur after the reception of the second message. In the third message (e.g., RRCResumeRequest), UE 115-*a* may include an indication of its best SCG configuration index. The best stored SCG configuration may correspond to the SCG configuration determined by the UE to have a largest RSRP and/or RSRQ value of the SCG configurations, and the best SCG configuration index may be the index associated with such SCG configuration.

The fourth message (e.g., RRCResume message) may include a one bit indication of whether the network accepts the SCG configuration selected by UE 115-*a* in the third message. The one bit indication may indicate "true" if the network accepts the SCG configuration in the third message. The one bit indication may indicate "false" if the network does not accept the SCG configuration. In the case where the fourth message includes a false configuration, the fourth message may also include a new SCG configuration.

If UE 115-*a* receives a "true" indication in the fourth message, then UE 115-*a* will keep the stored SCG configuration. IF UE 115-*a* receive a "false" indication, then UE 115-*a* may apply and store the new SCG configuration.

First base station 105-*a* may then transmit a Msg4 of the RACH procedure to resume the RRC connection with UE 115-*a* and indicated the selected SCG configuration. base station 105-*a* may simultaneously transmit an activation request to second base station 105-*b* based on storing the context of second base station 105-*b* (e.g., including the SCG lower-layer configuration). UE 115-*a* may apply a new SCG configuration or maintain the previously applied SCG configuration based on the Msg4 from base station 105-*a*. After receiving Msg4 and then transmitting Msg5 to complete the resuming of the RRC connection with first base station 105-*a*, UE 115-*a* may then perform a RACH procedure with a PSCell of second base station 105-*b*. Upon a successful RACH procedure at the PSCell, UE 115-*a* may resume its connection with both first base station 105-*a* (e.g., MN) and second base station 105-*b* (e.g., SN) based on the applied SCG configuration.

The use of UE based and network based blind resume of SCG communications may reduce signaling overhead needed to fully configure one or more cells for the DC deployment. The described techniques may accordingly be applicable for DC configurations (e.g., NE-DC, EN-DC, or the like) when UE 115-*a* resumes communications from an RRC inactive state 225. Similarly, the described techniques may be applied to CA configurations when UE 115-*a* transitions out of the RRC inactive state 225. Additionally or alternatively, the described techniques may be applicable to scenarios where UE 115-*a* is connected with a single base station to efficiently set up DC or CA when UE 115-*a* resumes communications from an RRC inactive state 225.

Figure 3:
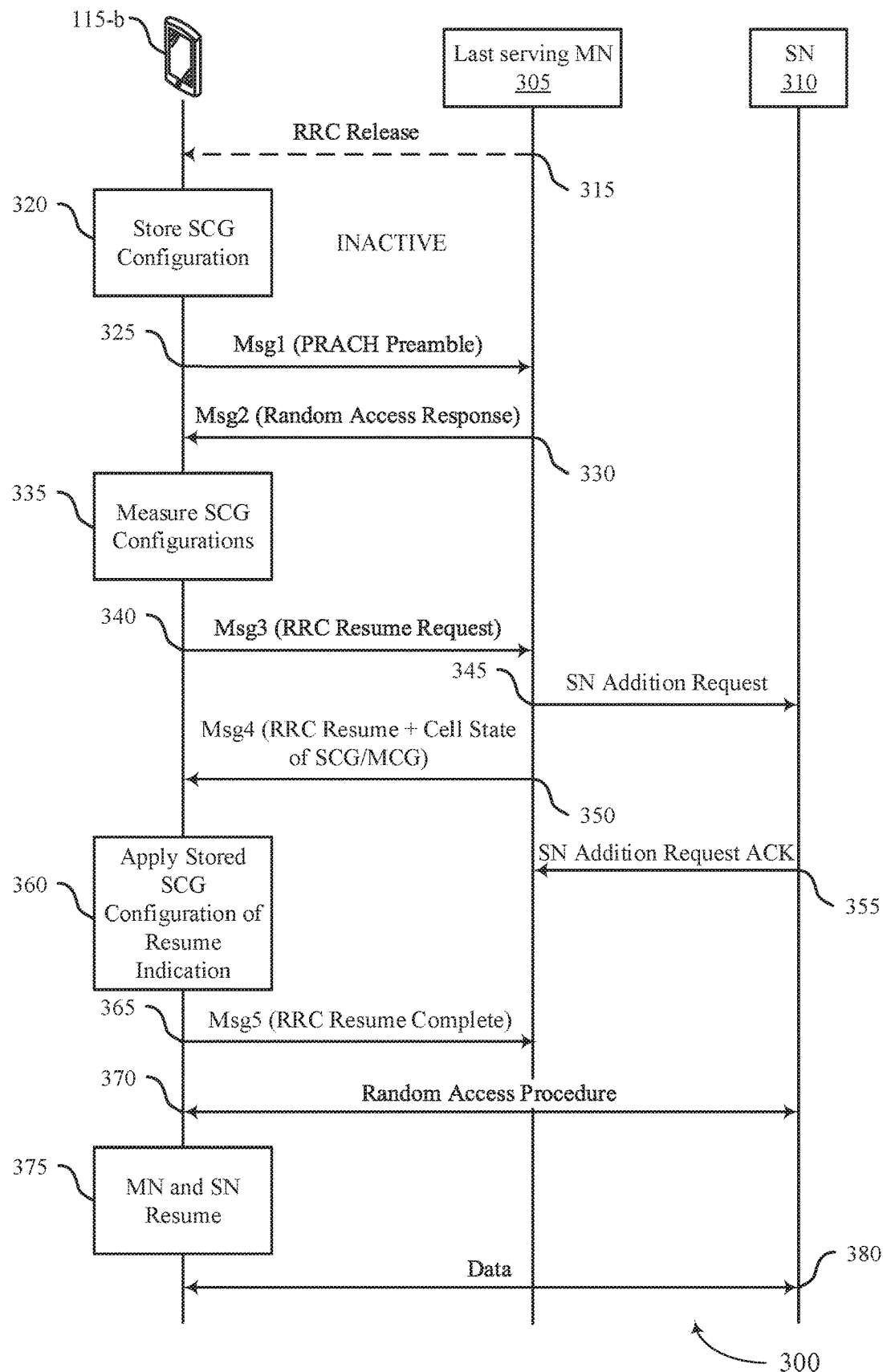
FIG. 3 illustrates an example of a process flow that supports NR blind resume in accordance with aspects of the present disclosure.

FIG. 3 illustrates an example of a process flow 300 that supports NR blind resume in accordance with aspects of the present disclosure. In some examples, process flow 300 may implement aspects of wireless communications systems 100 or 200. Process flow 300 may include a UE 115-*b*, a last serving MN 305, and an SN 310. UE 115-*b* may be an example of a UE 115 as described herein with reference to FIGS. 1-2. Last serving MN 305 may be an example of a base station 105, MN, MCG, PCell, etc., as described herein with reference to FIGS. 1-2. Additionally, SN 310 may be an example of a base station 105, SN, SCG, SCell, PSCell, etc., as described herein with reference to FIGS. 1-2. UE 115-*b* may operate in a DC configuration with last serving MN 305 and SN 310. In some cases, last serving MN 305 may operate in a first RAT, and SN 310 may operate in a second RAT, which may be different or the same as the first RAT, indicating a MR-DC configuration for communications between UE 115-*b*, last serving MN 305, and SN 310.

At 315, UE 115-*b* may receive, from last serving MN 305, a release message instructing UE 115-*b* to enter an inactive communications state with SN 310, and suspend communications between UE 115-*c* and SN 310. The release message (e.g., RRCRelease) may include an indication for UE 115-*b* to suspend communications on the initial SCG configuration.

The release message may also include an indication of the cell state (e.g., StateSCell) of each SCell in the MCG and in the SCG. The cell state may be one of deactivated, activated, or dormant. The release message may also include a new set of security keys, generated using NCC.

For example, the release message may include an indication of a set of SCG configurations for the UE. The release message may include an indication from the MN of the SCG configuration to use to resume communications with the SN (e.g., a resume-indication). At 320, UE 115-*b* may store the SCG configuration designated by MN 305 as the SCG configuration to resume communications on. UE 115-*c* may store a set of higher layer SCG configurations and a corresponding set of lower layer SCG configurations based on the set of SCG configurations. While in the inactive state, UE 115-*b* may determine to resume communications with a secondary node (e.g., and SCG). Based on this determination, UE 115-*b* may determine an SCG configuration for communication with the secondary node based on a process of network based blind resume.

At 325, UE 115-*b* may transition to a connected communication state as described herein with reference to FIG. 2. Accordingly, UE 115-*c* may initiate a RACH procedure to resume communications with its last serving MN 305. For example, UE 115-*c* may transmit a Msg1 of the RACH procedure that includes a physical random access channel (PRACH) preamble. In some cases, UE 115-*c* may initiate the RACH procedure based on determining that SN communication are to resume. At 330, last serving MN 305 may transmit a Msg2 of the RACH procedure including a RAR based on the Msg1.

At 335, UE 115-*b* may conduct measurements on one or more of the received set of candidate SCG configurations, which may have been received as part on the release message at 315. UE 115-*b* may measure signaling from at least one SN after determining to resume communications with the SN, and the SCG may be selected based on measuring the signaling. UE 115-*b* may select an initial SCG configuration based on a previous set of RSRP/RSRQ measurements or other measurements, and UE 115-*b* may determine which SCG configuration of the set of SCG configurations received in the release message that it has selected at the SCG configuration to resume communications on. At 340, UE 115-*b* may transmit a Msg3, resume request message, (e.g., RRCResume Request) to MN 305. Msg3 may include an indication of the selected initial SCG configuration. The selected SCG configuration may also be sent multiplexed with Msg3 at 340. The security keys received by UE 115-*b* at 315 may be used for ciphering Msg3 at 340 or for multiplexing the preferred SCG configuration with Msg3 at 340.

At 345, last serving MN 305 may transmit, to SN 310 of the DC configuration an activation request message for the SN communications based on receiving the message from the UE that the secondary node communications are to resume (e.g., Msg3 at 340). At 350, last serving MN 305 may transmit, to UE 115-*b*, a resume communications message (e.g., Msg4 of the RACH procedure or RRCResume message) including an indication for UE 115-*b* to resume communications with the SN using the SCG. The indication may be received via an RRC message that includes data for UE 115-*b*. In some cases, 345 and 350 may be transmitted by last serving MN 305 at the same time, where last serving MN 305 transmits the resume communications message 350 and the activation request message 345 simultaneously based on last serving MN 305 storing a context for SN 310 (e.g., including a lower-layer SCG configuration that may be used for SN 310). Additionally, at 355, SN 310 may transmit an SN addition request ACK message based on receiving the activation request message, where the SN addition request ACK message confirms that UE 115-*b* may initiate communications with SN 310 for the DC configuration.

At 350, UE 115-*b* may receive the resume communications message (e.g., Msg4 of the RACH procedure or RRCResume message)) indicating to UE 115-*b* to resume communication with the SN. Msg4 may include an SCG configuration and an indication of the SCell states (e.g., SCellState). The SCell states may be one or more of activated, deactivated, or dormant. In some cases, there may be no SCG configuration in Msg4. This may indicate that no SCG configuration may be resumed. In some other cases, Msg4 may include a one bit indication, which may indicate either "true" or "false." In cases where the one bit indicates true, the may mean that the SCG configuration stored by UE 115-*b* and previously sent in the third message at 340, is the SCG configuration to be resumed on. In cases where the one bit indicates "false," the last serving MN may indicate that the SCG configuration stored by UE 115-*b* is not the SCG configuration to use, and the MN may also include a new SCG configuration in the fourth message.

At 360, UE 115-*b* may apply either the stored configuration or the transmitted new configuration after receiving Msg4, indicating the selected SCG configuration. In cases where Msg4 does not include a resume indication, UE 115-*b* may discard the stored SCG configuration and may perform a set of SCG configuration measurements to report to the network in order to determine a new SCG configuration. UE 115-*b* may also discard the set of SCG configurations based on the SCG configuration indicated by the MN being different than all SCG configurations of the set of SCG configurations.

UE 115-*b* may perform a RACH procedure with the SN based on the determined SCG configuration. UE 115-*b* may communicate with the SN based on the performed RACH procedure. For example, at 375, UE 115-*b* may transmit a Msg5 of the RACH procedure to complete the resuming of communications with last serving MN 305 (e.g., RRCResumeComplete message). Subsequently, at 380, upon the additional RACH procedure being successful at the PSCell, UE 115-*b* may resume connections with both last serving MN 305 and SN 310 based on the applied SCG configuration. Accordingly, at 380, UE 115-*b* may transmit data back and forth with SN 310 based on resuming the connections on the determined SCG configuration.

Figure 4:
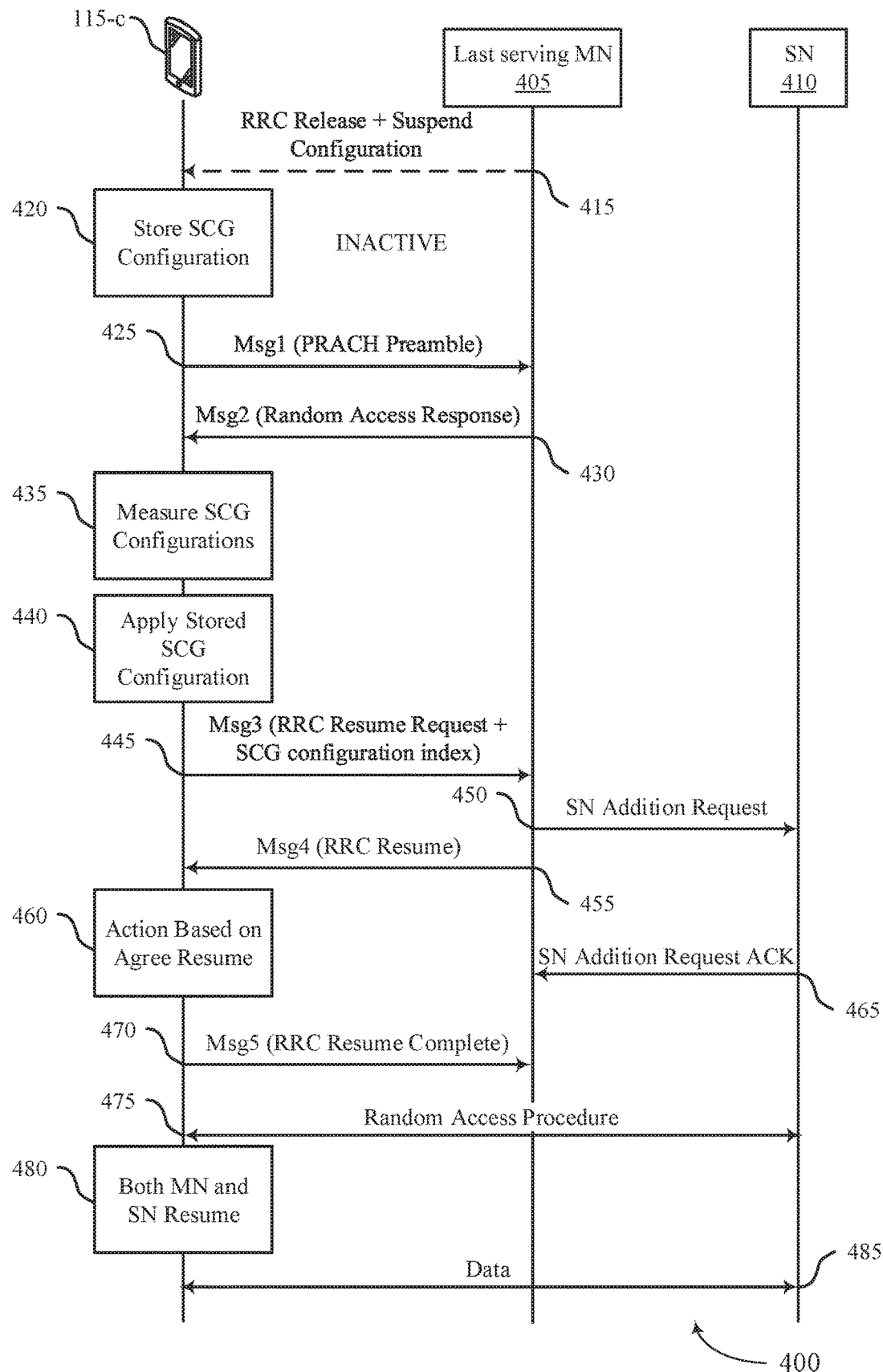
FIG. 4 illustrates an example of a process flow that supports NR blind resume in accordance with aspects of the present disclosure.

FIG. 4 illustrates an example of a process flow 400 that supports NR blind resume in accordance with aspects of the present disclosure. In some examples, process flow 400 may implement aspects of wireless communications systems 100 or 200. Process flow 400 may include a UE 115-*c*, a last serving MN 405, and an SN 410. UE 115-*c* may be an example of a UE 115 as described herein with reference to FIGS. 1-3. Last serving MN 305 may be an example of a base station 105, MN, MCG, PCell, etc., as described herein with reference to FIGS. 1-3. Additionally, SN 310 may be an example of a base station 105, SN, SCG, SCell, PSCell, etc., as described herein with reference to FIGS. 1-3. UE 115-*c* may be operating in a DC configuration with last serving MN 305 and SN 310. In some cases, last serving MN 305 may operate in a first RAT, and SN 310 may operate in a second RAT, which may be different or the same as the first RAT, indicating a MR-DC configuration for communications between UE 115-*g*, last serving MN 305, and SN 310.

Process flow 400 may include similar messages as described and transmitted in process flow 300. Process flow 400 may be a representation of UE based blind resume.

At 415, UE 115-*c* may receive a release message (e.g., RRCRelease) to suspend communications between UE 115-*c* and SN 410 (e.g., for UE 115-*c* to enter an inactive communication state). The release message may include an indication for UE 115-*c* to suspend communications on the initial SCG configuration. The release message may include a set of security keys that may have been generated using NCC.

As such, at 420, UE 115-*c* may enter the inactive communication state and store the higher-layer SCG configuration but may refrain from storing any lower-layer SCG configuration.

At 425, UE 115-*c* may transmit a first message (e.g., a PRACH Preamble) to the last serving MN 405. UE 115-*c* may perform similar steps as described in process flow 300

At 430, UE 115-*c* may receive a second message (e.g., a random access response message). UE 115-*c* may perform similar steps as described in process flow 300.

At 435, UE 115-*c* may perform measurements for the stored SCG configurations. UE 115-*c* may select an initial SCG configuration from the set of SCG configurations based on the measured signaling. Based on the performed measurements, UE 115-*c* may proactively restore and resume the SCG configuration with the highest measurement quality (e.g., RSRP/RSRQ). This highest measurement quality may be based on a comparison with a preconfigured threshold, which may have been conveyed in a previous message from one or more of the SN or MN, for example in RRC signaling.

At 440, UE 115-c may apply the determined SCG configuration with the highest quality measurements. UE 115-c may apply the initial SCG configuration selected by UE 115-c to communicate with the SN.

At 445, UE 115-c may transmit the third message (e.g., RRCResumeRequest) including an indication of the selected initial SCG configuration selected by UE 115-c that is applied at 440. UE 115-c may include this indication in the third message or multiplexed with the third message. UE 115-c may utilize the received NCC generated security keys to cipher the third message with the selected best configuration or for multiplexing the third message with the selected best SCG configuration.

At 450, last serving MN 405 may transmit, to SN 410 of the DC configuration an activation request message for the SN communications based on receiving the message from the UE that the secondary node communications are to resume (e.g., Msg3 at 340). At 455, last serving MN 405 may transmit, to UE 115-c, a resume communications message (e.g., Msg4 of the RACH procedure or RRCResume message) including an indication for UE 115-c to resume communications with the SN using the SCG. The indication may be received via an RRC message that includes data for UE 115-c. In some cases, 450 and 455 may be transmitted by last serving MN 405 at the same time, where last serving MN 405 transmits the resume communications message 455 and the activation request message 450 simultaneously based on last serving MN 405 storing a context for SN 410 (e.g., including a lower-layer SCG configuration that may be used for SN 410). Additionally, at 465, SN 310 may transmit an SN addition request ACK message based on receiving the activation request message, where the SN addition request ACK message confirms that UE 115-c may initiate communications with SN 410 for the DC configuration.

At 455, UE 115-c may receive a fourth message (e.g., Msg4, RRCResume). Msg4 may include an indication of the SCG configuration to use to resume communications on with the SN. The indication may include a one bit indication (e.g., RRCResume). The one bit indication may indication "true" or "false". If the one bit indication is "true" then this indicates that the network accepts the SCG configuration chosen by UE 115-c and applied at 440. MN 405 may indicate that the SCG configuration is the same as the initial SCG configuration. In this case, MN 405 may include a set of UE data multiplexed with the fourth message at 455. UE 115-c may receive, based on the SCG configuration being the same as the initial SCG configuration, data for the UE together with the indication of the SCG configuration.

In other cases, the one bit indication may be "false," and may indicate that the network does not accept the SCG configuration selected by UE 115-c and applied at 440. In this case, MN 405 may include a new SCG configuration in the fourth message at 455 along with the one bit "false" indication. The SCG configuration may be different that the initial SCG configuration. MN 405 may configure UE 115-c according to the indicated SCG configuration that is different than the initial SCG configuration.

At 460, UE 115-c may determine whether to keep the previously applied SCG configuration or apply a new SCG configuration. If the one bit indication received at 455 indicated "true," then UE 115-c may maintain the SCG configuration that was applied at 440. If the one bit indication received at 455 indicated "false," and the message sent at 455 also included a new SCG configuration from MN 405, then UE 115-c may apply the new SCG configuration received from MN 405 at 460.

At 470, 475, 480, and 485, UE 115-c may perform similar steps as described in process flow 300 to complete a resuming of a connection with last serving MN 405 (e.g., 470), perform an additional RACH with SN 810 (e.g., 475), resume connections with both last serving MN 405 and SN 410 (e.g., 480), and transmitting data back and forth with SN 810 based on resuming the connections (e.g., 485).

Figure 5:
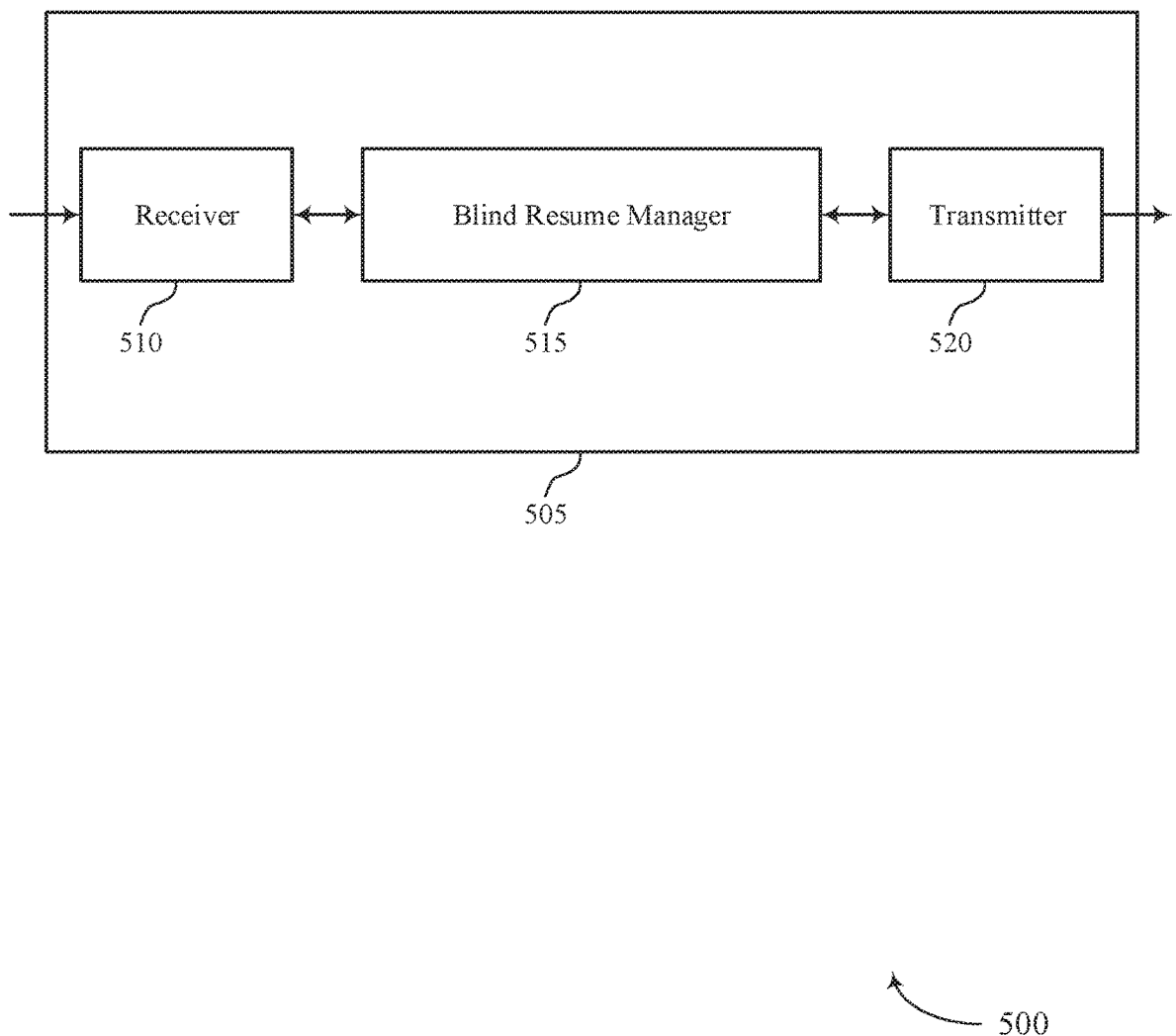
FIGS. 5 and 6 show block diagrams of devices that support NR blind resume in accordance with aspects of the present disclosure.

FIG. 5 shows a block diagram 500 of a device 505 that supports NR blind resume in accordance with aspects of the present disclosure. The device 505 may be an example of aspects of a UE 115 as described herein. The device 505 may include a receiver 510, a blind resume manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to NR blind resume, etc.). Information may be passed on to other components of the device 505. The receiver 510 may be an example of aspects of the transceiver 820 described with reference to FIG. 8. The receiver 510 may utilize a single antenna or a set of antennas.

The blind resume manager 515 may receive a message from the master node instructing the UE to enter an inactive state, the message including an indication of a set of secondary cell group configurations for the UE, determine, by the UE in the inactive state, to resume communications with the secondary node, determine, based on the determination to resume communications and the indication of the set of secondary cell group configurations, a secondary cell group configuration for communications with the secondary node, and communicate with the secondary node based on the secondary cell group configuration. The blind resume manager 515 may be an example of aspects of the blind resume manager 810 described herein.

The blind resume manager 515, or its sub-components, may be implemented in hardware, code (e.g., software or firmware) executed by a processor, or any combination thereof. If implemented in code executed by a processor, the functions of the blind resume manager 515, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The blind resume manager 515, or its sub-components, may be physically located at various positions, including being distributed such that portions of functions are implemented at different physical locations by one or more physical components. In some examples, the blind resume manager 515, or its sub-components, may be a separate and distinct component in accordance with various aspects of the present disclosure. In some examples, the blind resume manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
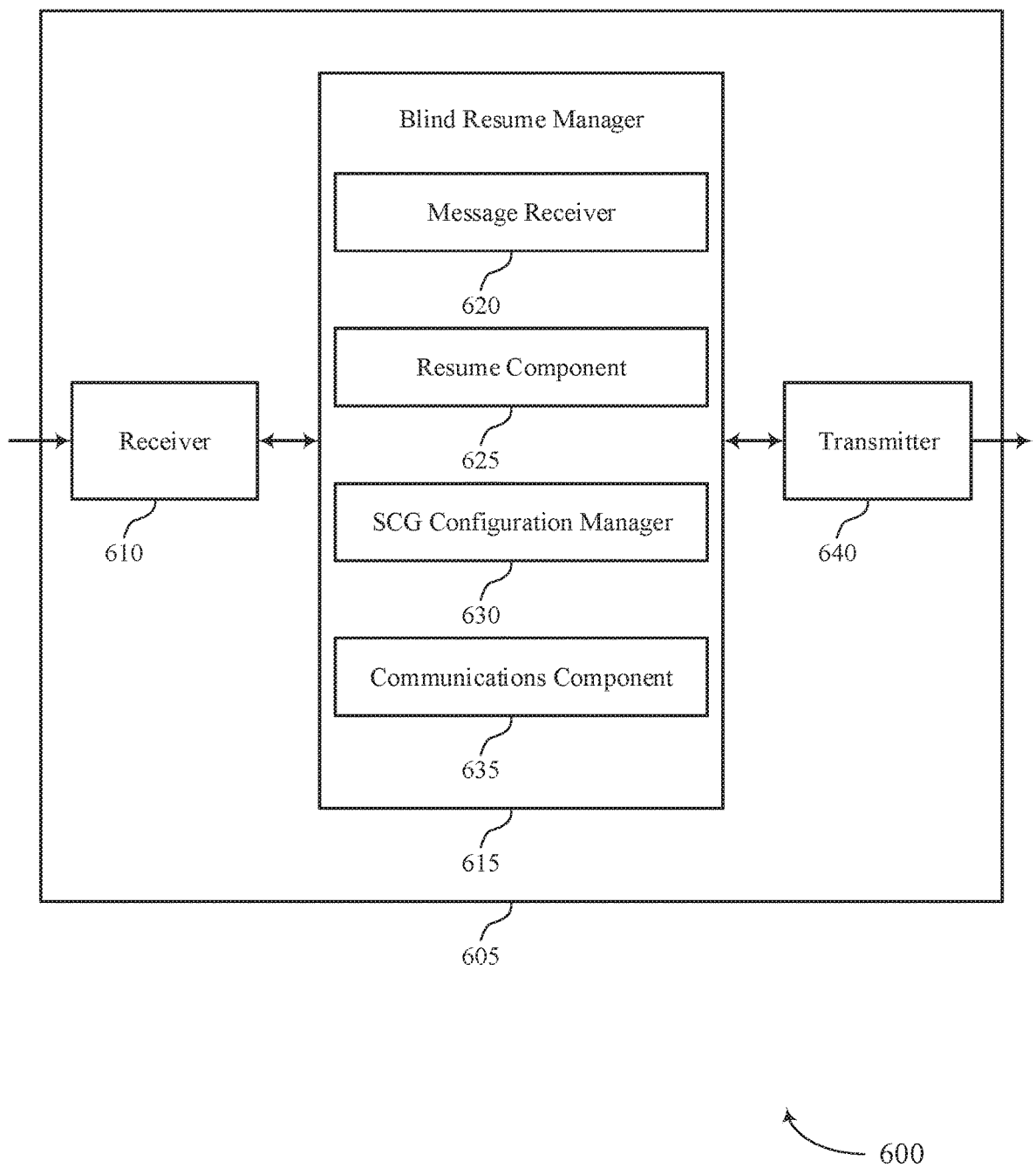

FIG. 6 shows a block diagram 600 of a device 605 that supports NR blind resume in accordance with aspects of the present disclosure. The device 605 may be an example of aspects of a device 505, or a UE 115 as described herein. The device 605 may include a receiver 610, a blind resume manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to NR blind resume, etc.). Information may be passed on to other components of the device 605. The receiver 610 may be an example of aspects of the transceiver 820 described with reference to FIG. 8. The receiver 610 may utilize a single antenna or a set of antennas.

The blind resume manager 615 may be an example of aspects of the blind resume manager 515 as described herein. The blind resume manager 615 may include a message receiver 620, a resume component 625, a SCG configuration manager 630, and a communications component 635. The blind resume manager 615 may be an example of aspects of the blind resume manager 810 described herein.

The message receiver 620 may receive a message from the master node instructing the UE to enter an inactive state, the message including an indication of a set of secondary cell group configurations for the UE.

The resume component 625 may determine, by the UE in the inactive state, to resume communications with the secondary node.

The SCG configuration manager 630 may determine, based on the determination to resume communications and the indication of the set of secondary cell group configurations, a secondary cell group configuration for communications with the secondary node.

The communications component 635 may communicate with the secondary node based on the secondary cell group configuration.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
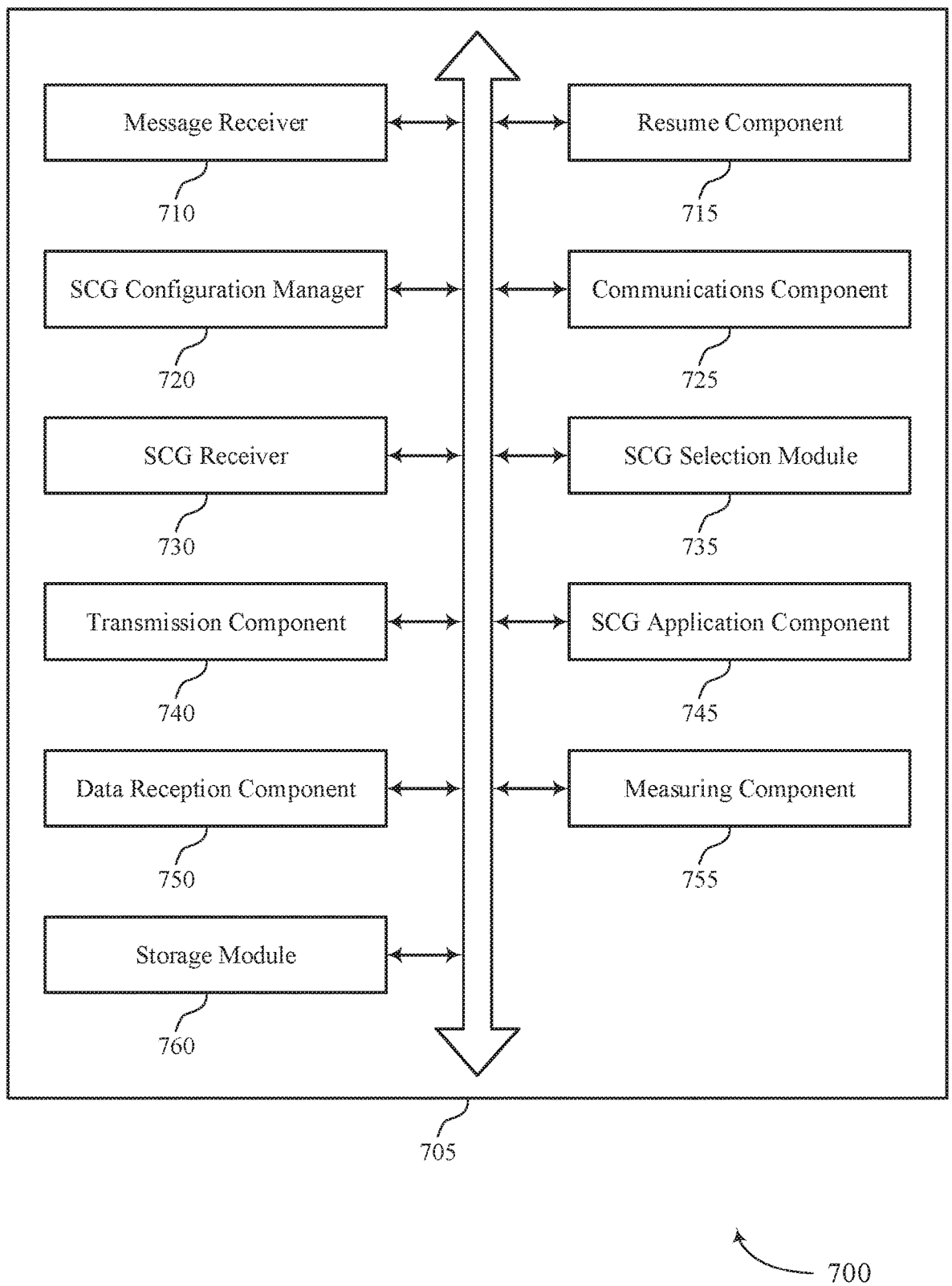
FIG. 7 shows a block diagram of a blind resume manager that supports NR blind resume in accordance with aspects of the present disclosure.

FIG. 7 shows a block diagram 700 of a blind resume manager 705 that supports NR blind resume in accordance with aspects of the present disclosure. The blind resume manager 705 may be an example of aspects of a blind resume manager 515, a blind resume manager 615, or a blind resume manager 810 described herein. The blind resume manager 705 may include a message receiver 710, a resume component 715, a SCG configuration manager 720, a communications component 725, a SCG receiver 730, a SCG selection module 735, a transmission component 740, a SCG application component 745, a data reception component 750, a measuring component 755, and a storage module 760. Each of these modules may communicate, directly or indirectly, with one another (e.g., via one or more buses).

The message receiver 710 may receive a message from the master node instructing the UE to enter an inactive state, the message including an indication of a set of secondary cell group configurations for the UE. In some cases, the message from the master node instructing the UE to enter the inactive state includes a RRC release message. In some examples, the message from the master node instructing the UE to enter the inactive state includes a NCC. In some aspects, the message from the master node instructing the UE to enter the inactive state includes a reference signal received power threshold, a reference signal received quality threshold, or a combination thereof, for use by the UE to validate secondary cell group configurations upon resuming communications.

The resume component 715 may determine, by the UE in the inactive state, to resume communications with the secondary node.

The SCG configuration manager 720 may determine, based on the determination to resume communications and the indication of the set of secondary cell group configurations, a secondary cell group configuration for communications with the secondary node. In some examples, the SCG configuration manager 720 may apply the indicated secondary cell group configuration to communicate with the secondary node. In some cases, the SCG configuration manager 720 may configure the UE according to the indicated secondary cell group configuration different than the initial secondary cell group configuration. In some aspects, the SCG configuration manager 720 may discard the set of secondary cell group configurations based on the secondary cell group configuration being different than all secondary cell group configurations of the set of secondary cell group configurations.

The communications component 725 may communicate with the secondary node based on the secondary cell group configuration. In some instances, the communications component 725 may perform a random access procedure with the secondary based on the determined secondary cell group configuration, where communicating with the secondary node is based on the performed random access procedure.

The SCG receiver 730 may receive, from the master node, an indication of the secondary cell group configuration to use to resume communications with the secondary node, the secondary cell group configuration determined based on the received indication of the secondary cell group configuration. In some examples, receiving an indication to resume communications with the secondary node using the secondary cell group configuration via a RRC message, where the RRC message includes a secondary cell state associated with the secondary cell group configuration. In some cases, the SCG receiver 730 may receive, from the master node, an indication of the secondary cell group configuration to use to resume communications with the secondary node, where the secondary cell group configuration is a different configuration than the initial secondary cell group configuration. In some instances, the SCG receiver 730 may receive, from the master node, an indication of the secondary cell group configuration to use to resume communications with the secondary node, where the secondary cell group configuration is a same configuration as the initial secondary cell group configuration. In some aspects, the indication of the secondary cell group configuration is ciphered based on a security key generated using a NCC included in the message from the master node instructing the UE to enter the inactive state. In some cases, the secondary cell state includes one of activated, deactivated, or dormant.

The SCG selection module 735 may select an initial secondary cell group configuration from the set of secondary cell group configurations. In some examples, the SCG selection module 735 may select, by the UE, an initial secondary cell group configuration from the set of secondary cell group configurations.

The transmission component 740 may transmit, to the master node, an indication of the initial secondary cell group configuration, the indication of the secondary cell group configuration received from the master node in response to the transmitted indication of the initial secondary cell group configuration. In some examples, the transmission component 740 may transmit, to the master node after applying the initial secondary cell group configuration, an indication of the initial secondary cell group configuration selected by the UE. In some cases, the indication of the secondary cell group configuration is ciphered with a security key generated based on a Next Hop Chaining Counter (NCC) included in the message from the master node instructing the UE to enter the inactive state.

The SCG application component 745 may apply the initial secondary cell group configuration selected by the UE to communicate with the secondary node.

The data reception component 750 may receive, based on the secondary cell group configuration being the same configuration as the initial secondary cell group configuration, data for the UE together with the indication of the secondary cell group configuration. In some cases, the indication to resume communications with the secondary node using the secondary cell group configuration is received via a RRC message that includes data for the UE.

The measuring component 755 may measure, based on the set of secondary cell group configurations, signaling from at least one secondary node after determining to resume communications with the secondary node, the secondary cell group configuration determined based on the measuring. In some examples, the measuring component 755 may measure a reference signal received power, a reference signal received quality, or a combination thereof, of the signaling.

The storage module 760 may store a set of higher layer secondary cell group configurations and a corresponding set of lower layer secondary cell group configurations based on the set of secondary cell group configurations.

Figure 8:
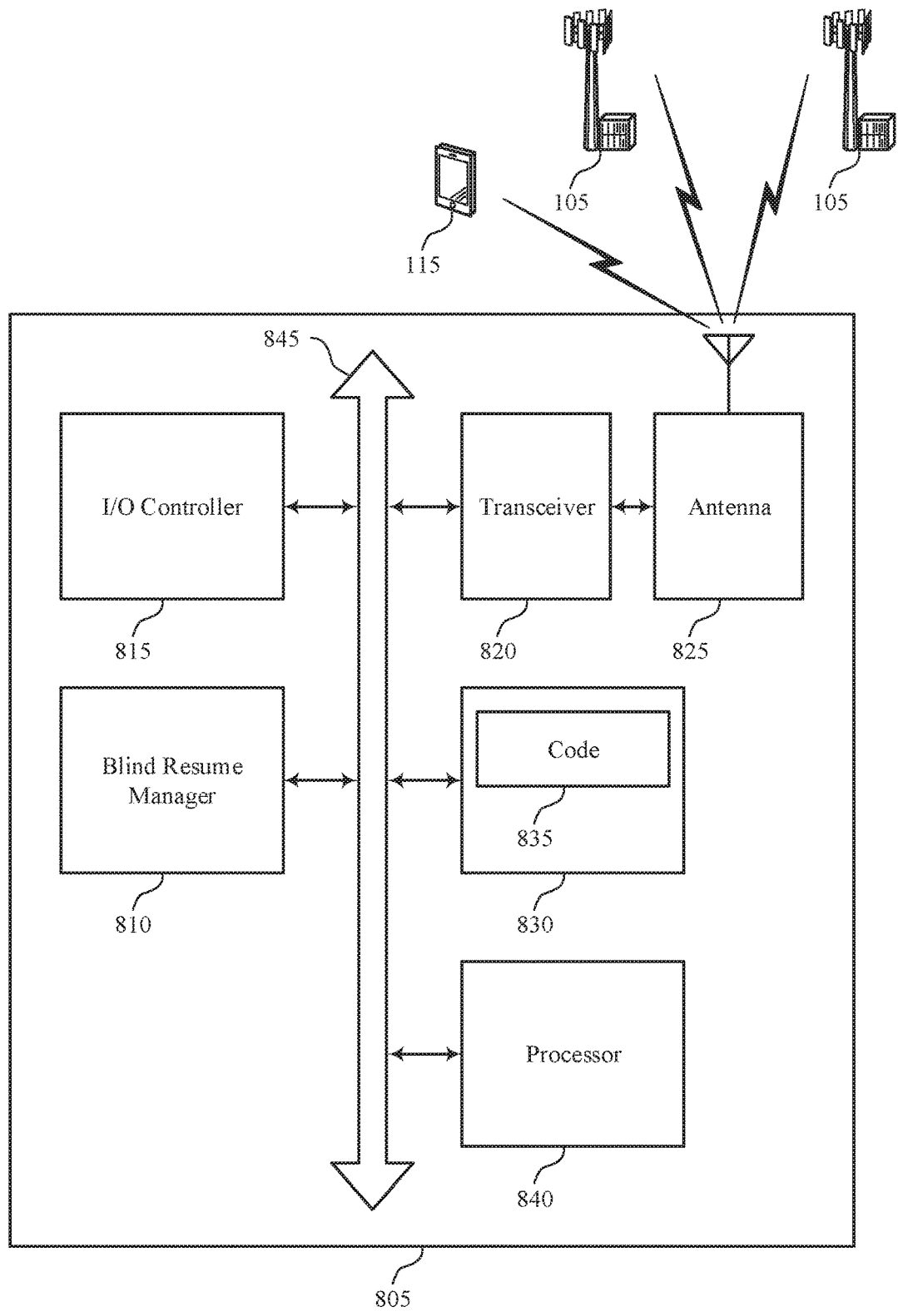
FIG. 8 shows a diagram of a system including a device that supports NR blind resume in accordance with aspects of the present disclosure.

FIG. 8 shows a diagram of a system 800 including a device 805 that supports NR blind resume in accordance with aspects of the present disclosure. The device 805 may be an example of or include the components of device 505, device 605, or a UE 115 as described herein. The device 805 may include components for bi-directional voice and data communications including components for transmitting and receiving communications, including a blind resume manager 810, an I/O controller 815, a transceiver 820, an antenna 825, memory 830, and a processor 840. These components may be in electronic communication via one or more buses (e.g., bus 845).

The blind resume manager 810 may receive a message from the master node instructing the UE to enter an inactive state, the message including an indication of a set of secondary cell group configurations for the UE, determine, by the UE in the inactive state, to resume communications with the secondary node, determine, based on the determination to resume communications and the indication of the set of secondary cell group configurations, a secondary cell group configuration for communications with the secondary node, and communicate with the secondary node based on the secondary cell group configuration.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting NR blind resume).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
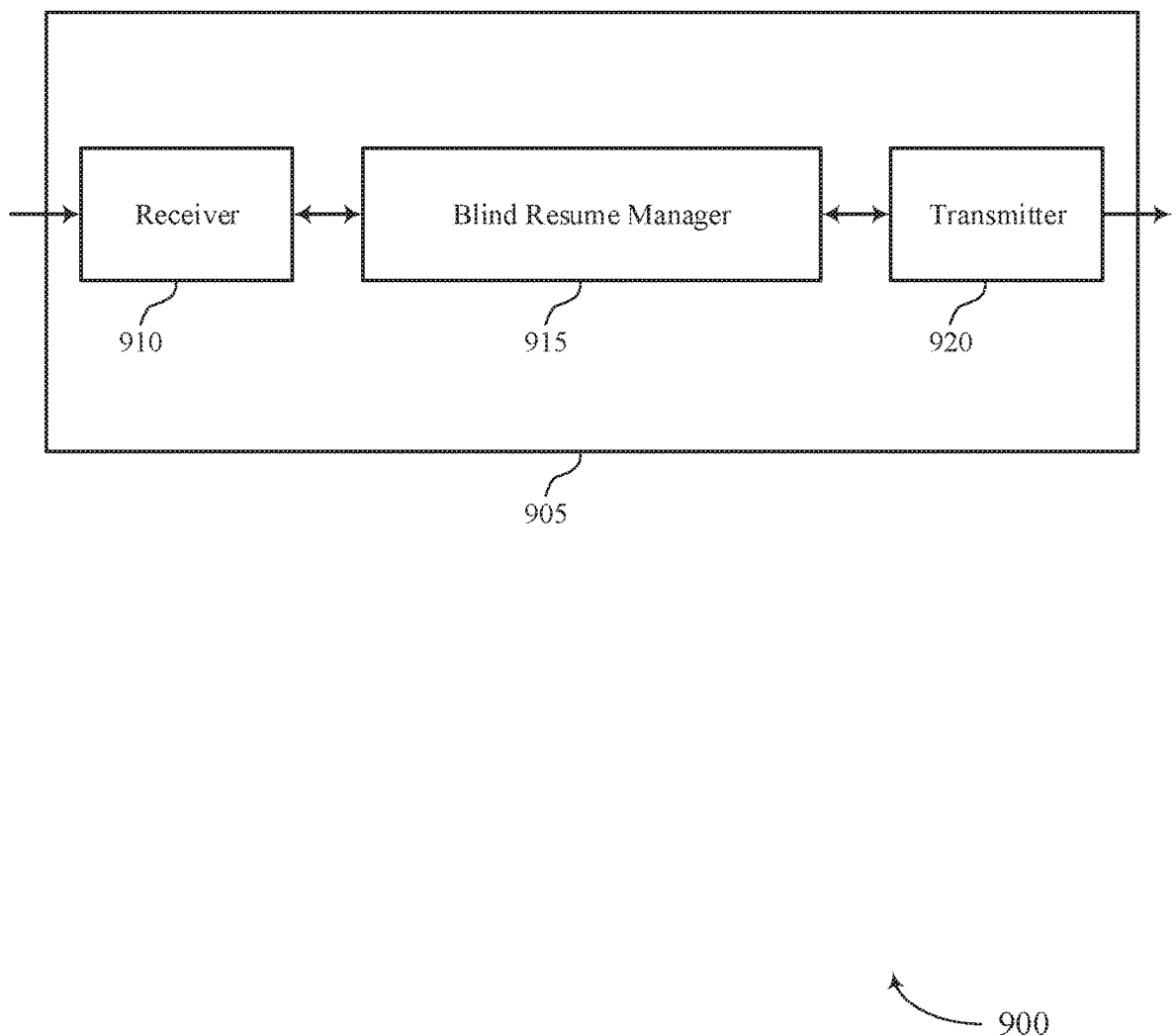
FIGS. 9 and 10 show block diagrams of devices that support NR blind resume in accordance with aspects of the present disclosure.

FIG. 9 shows a block diagram 900 of a device 905 that supports NR blind resume in accordance with aspects of the present disclosure. The device 905 may be an example of aspects of a base station 105 as described herein. The device 905 may include a receiver 910, a blind resume manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to NR blind resume, etc.). Information may be passed on to other components of the device 905. The receiver 910 may be an example of aspects of the transceiver 1220 described with reference to FIG. 12. The receiver 910 may utilize a single antenna or a set of antennas.

The blind resume manager 915 may transmit a message to the UE instructing the UE to enter an inactive state, the message including an indication of a set of secondary cell group configurations for the UE, determine that the UE is to resume communications with the secondary node, determine, based on the determination to resume communications and the set of secondary cell group configurations, a secondary cell group configuration for communications between the UE and the secondary node, and transmit, to the UE, an indication to resume communications with the secondary node using the secondary cell group configuration. The blind resume manager 915 may be an example of aspects of the blind resume manager 1210 described herein.

The blind resume manager 915, or its sub-components, may be implemented in hardware, code (e.g., software or firmware) executed by a processor, or any combination thereof. If implemented in code executed by a processor, the functions of the blind resume manager 915, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The blind resume manager 915, or its sub-components, may be physically located at various positions, including being distributed such that portions of functions are implemented at different physical locations by one or more physical components. In some examples, the blind resume manager 915, or its sub-components, may be a separate and distinct component in accordance with various aspects of the present disclosure. In some examples, the blind resume manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
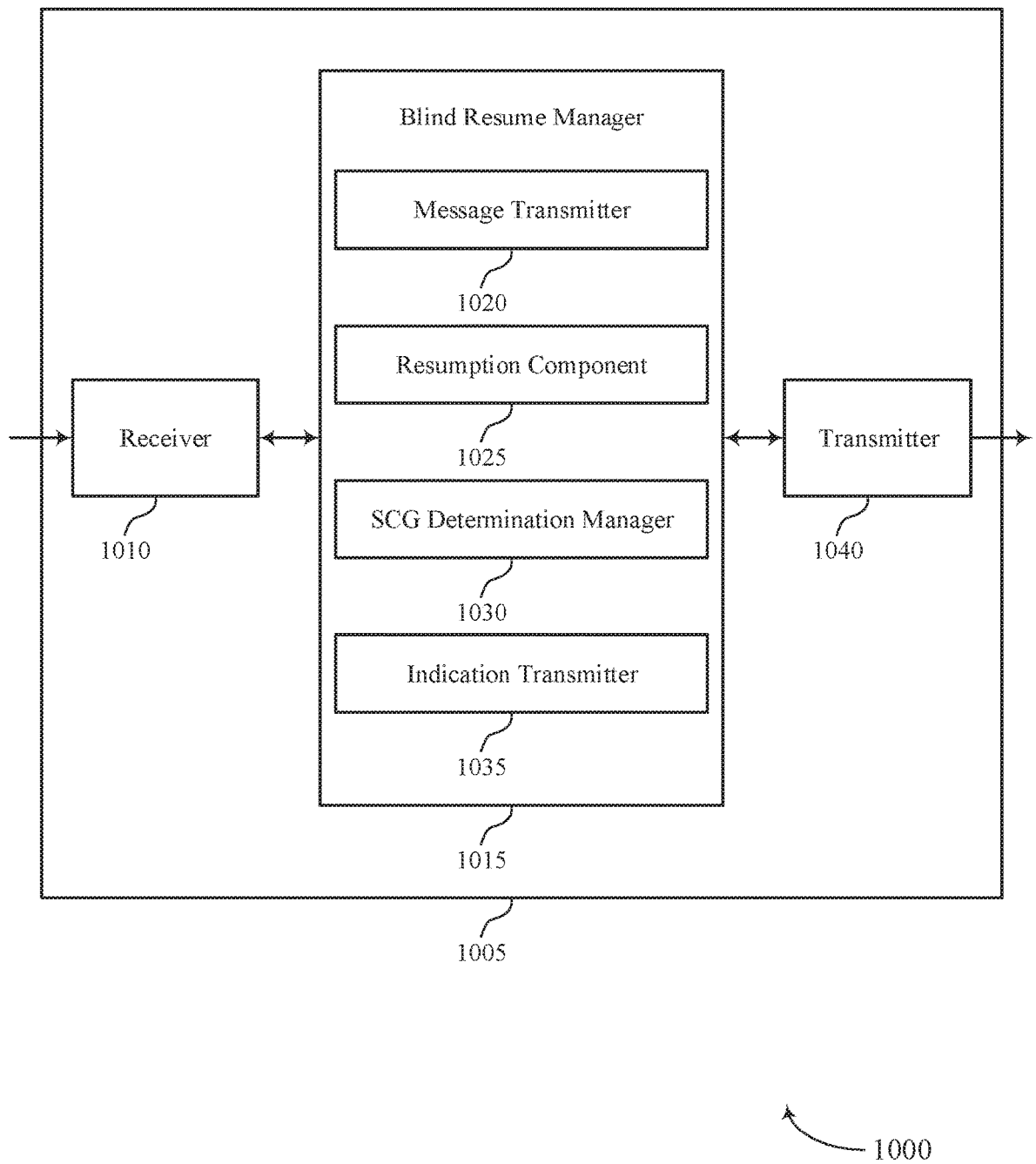

FIG. 10 shows a block diagram 1000 of a device 1005 that supports NR blind resume in accordance with aspects of the present disclosure. The device 1005 may be an example of aspects of a device 905, or a base station 105 as described herein. The device 1005 may include a receiver 1010, a blind resume manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to NR blind resume, etc.). Information may be passed on to other components of the device 1005. The receiver 1010 may be an example of aspects of the transceiver 1220 described with reference to FIG. 12. The receiver 1010 may utilize a single antenna or a set of antennas.

The blind resume manager 1015 may be an example of aspects of the blind resume manager 915 as described herein. The blind resume manager 1015 may include a message transmitter 1020, a resumption component 1025, a SCG determination manager 1030, and an indication transmitter 1035. The blind resume manager 1015 may be an example of aspects of the blind resume manager 1210 described herein.

The message transmitter 1020 may transmit a message to the UE instructing the UE to enter an inactive state, the message including an indication of a set of secondary cell group configurations for the UE.

The resumption component 1025 may determine that the UE is to resume communications with the secondary node.

The SCG determination manager 1030 may determine, based on the determination to resume communications and the set of secondary cell group configurations, a secondary cell group configuration for communications between the UE and the secondary node.

The indication transmitter 1035 may transmit, to the UE, an indication to resume communications with the secondary node using the secondary cell group configuration.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
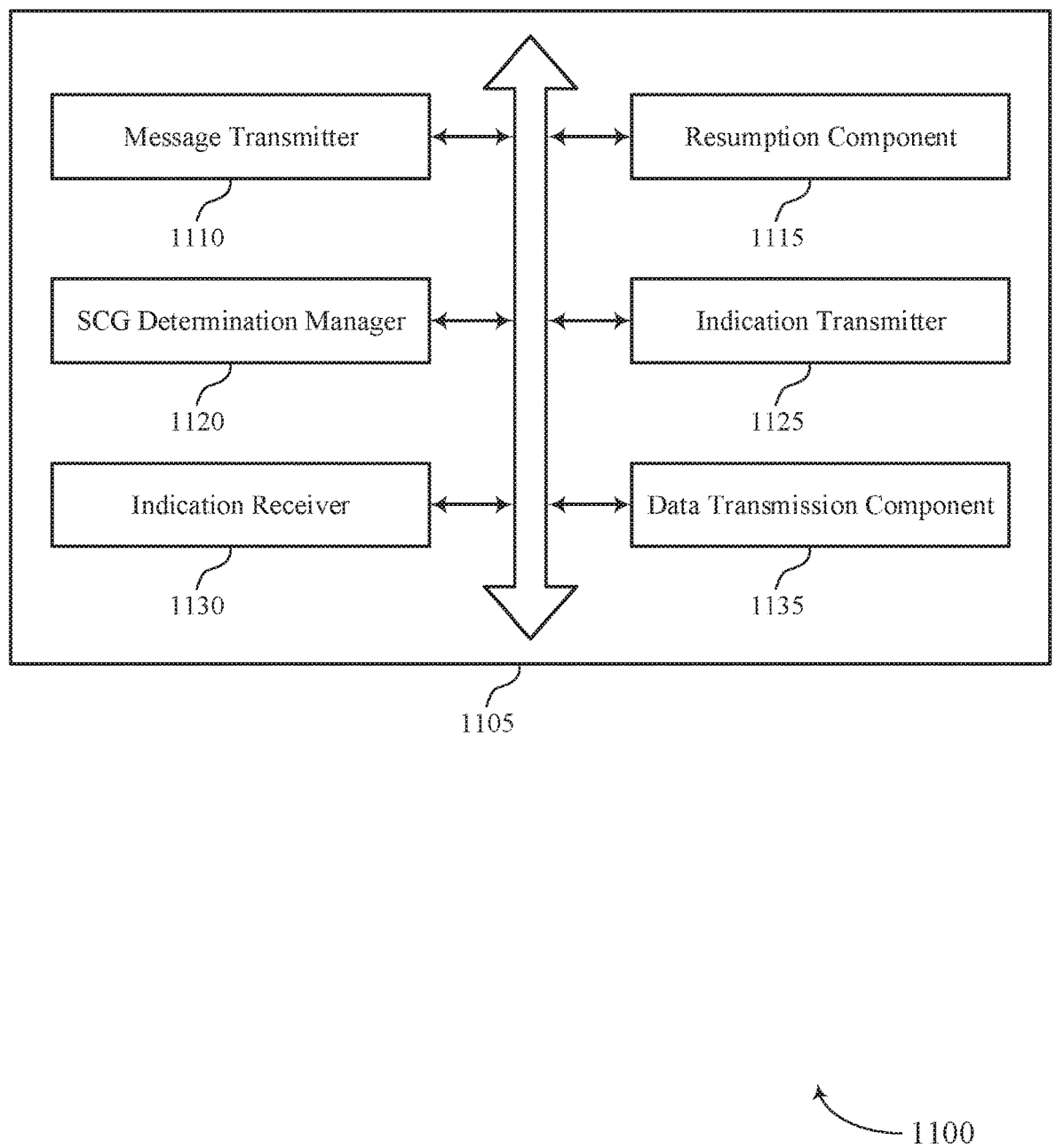
FIG. 11 shows a block diagram of a blind resume manager that supports NR blind resume in accordance with aspects of the present disclosure.

FIG. 11 shows a block diagram 1100 of a blind resume manager 1105 that supports NR blind resume in accordance with aspects of the present disclosure. The blind resume manager 1105 may be an example of aspects of a blind resume manager 915, a blind resume manager 1015, or a blind resume manager 1210 described herein. The blind resume manager 1105 may include a message transmitter 1110, a resumption component 1115, a SCG determination manager 1120, an indication transmitter 1125, an indication receiver 1130, and a data transmission component 1135. Each of these modules may communicate, directly or indirectly, with one another (e.g., via one or more buses).

The message transmitter 1110 may transmit a message to the UE instructing the UE to enter an inactive state, the message including an indication of a set of secondary cell group configurations for the UE.

In some cases, the message transmitted to the UE instructing the UE to enter the inactive state includes a RRC release message.

In some cases, the message transmitted to the UE instructing the UE to enter the inactive state includes a NCC and the indication to resume communications is ciphered with a security key generated based on the NCC.

In some cases, the message transmitted to the UE instructing the UE to enter the inactive state includes a reference signal received power threshold, a reference signal received quality threshold, or a combination thereof, for use by the UE to validate secondary cell group configurations upon resuming communications.

The resumption component 1115 may determine that the UE is to resume communications with the secondary node.

The SCG determination manager 1120 may determine, based on the determination to resume communications and the set of secondary cell group configurations, a secondary cell group configuration for communications between the UE and the secondary node.

The indication transmitter 1125 may transmit, to the UE, an indication to resume communications with the secondary node using the secondary cell group configuration.

In some examples, transmitting the indication to resume communications with the secondary node using the secondary cell group configuration via a RRC message, where the RRC message includes a secondary cell state associated with the secondary cell group configuration.

In some examples, the indication transmitter 1125 may transmit, to the UE, an indication of the secondary cell group configuration to use to resume communications with the secondary node, where the secondary cell group configuration is a different configuration than the selected secondary cell group configuration.

In some examples, the indication transmitter 1125 may transmit, to the UE, an indication of the secondary cell group configuration to use to resume communications with the secondary node, where the secondary cell group configuration is a same configuration as the selected secondary cell group configuration.

In some cases, the secondary cell state includes one of activated, deactivated, or dormant.

The indication receiver 1130 may receive, from the UE, an indication of a selected secondary cell group configuration for the UE, the indication of the selected secondary cell group configuration received in response to the transmitted indication of the set of secondary cell group configurations for the UE.

In some examples, the indication receiver 1130 may receive, from the UE, an indication of a selected secondary cell group configuration applied by the UE.

In some cases, the indication of the selected secondary cell group configuration is ciphered with a security key generated based on a NCC included in the message to the UE instructing the UE to enter an inactive state.

In some cases, the indication of the selected secondary cell group configuration applied by the UE is ciphered based on a security key generated using a NCC included in the message to the UE instructing the UE to enter the inactive state.

The data transmission component 1135 may transmit, based on the secondary cell group configuration being the same configuration as the selected secondary cell group configuration, data for the UE together with the indication of the secondary cell group configuration.

Figure 12:
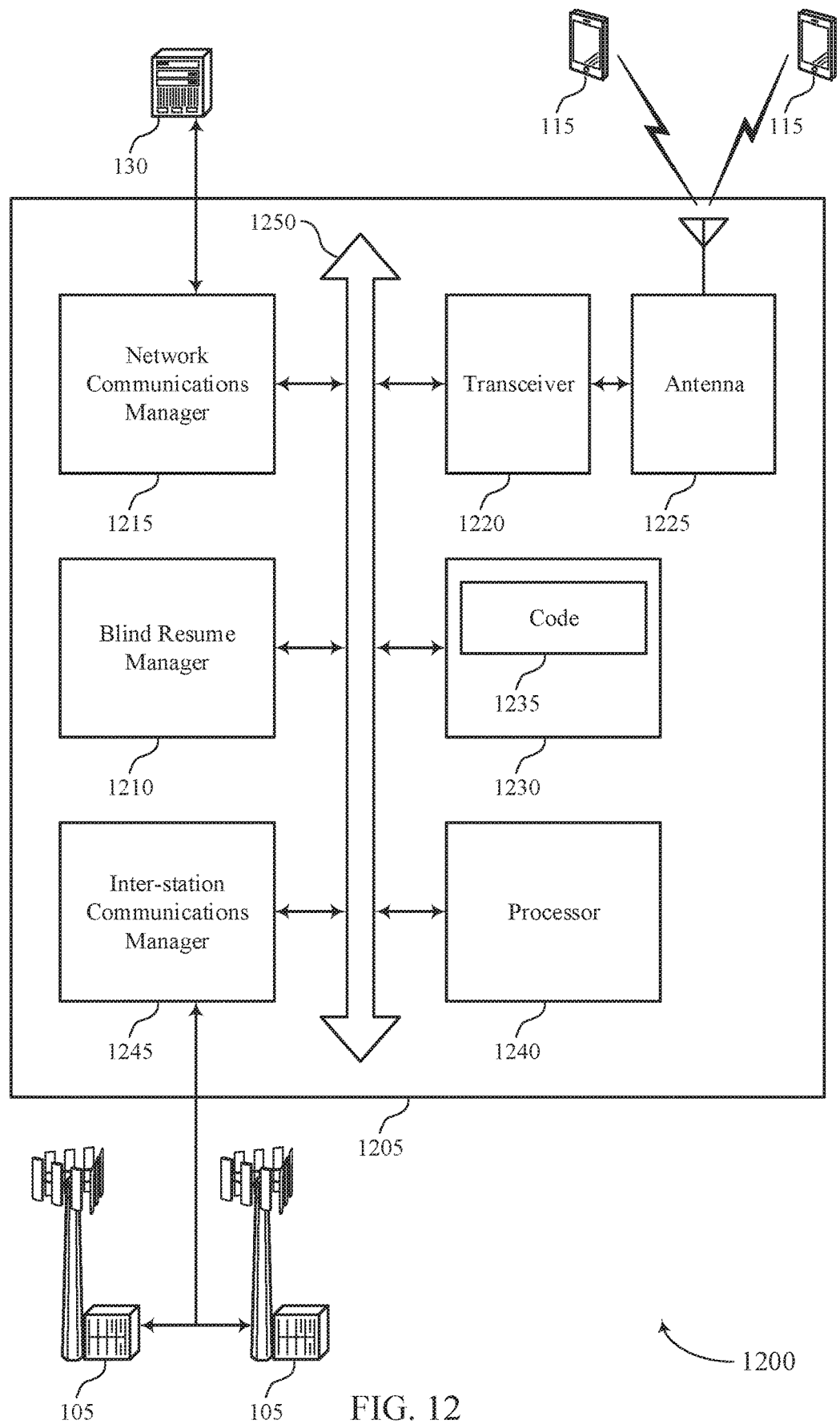
FIG. 12 shows a diagram of a system including a device that supports NR blind resume in accordance with aspects of the present disclosure.

FIG. 12 shows a diagram of a system 1200 including a device 1205 that supports NR blind resume in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a blind resume manager 1210, a network communications manager 1215, a transceiver 1220, an antenna 1225, memory 1230, a processor 1240, and an inter-station communications manager 1245. These components may be in electronic communication via one or more buses (e.g., bus 1250).

The blind resume manager 1210 may transmit a message to the UE instructing the UE to enter an inactive state, the message including an indication of a set of secondary cell group configurations for the UE, determine that the UE is to resume communications with the secondary node, determine, based on the determination to resume communications and the set of secondary cell group configurations, a secondary cell group configuration for communications between the UE and the secondary node, and transmit, to the UE, an indication to resume communications with the secondary node using the secondary cell group configuration.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting NR blind resume).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
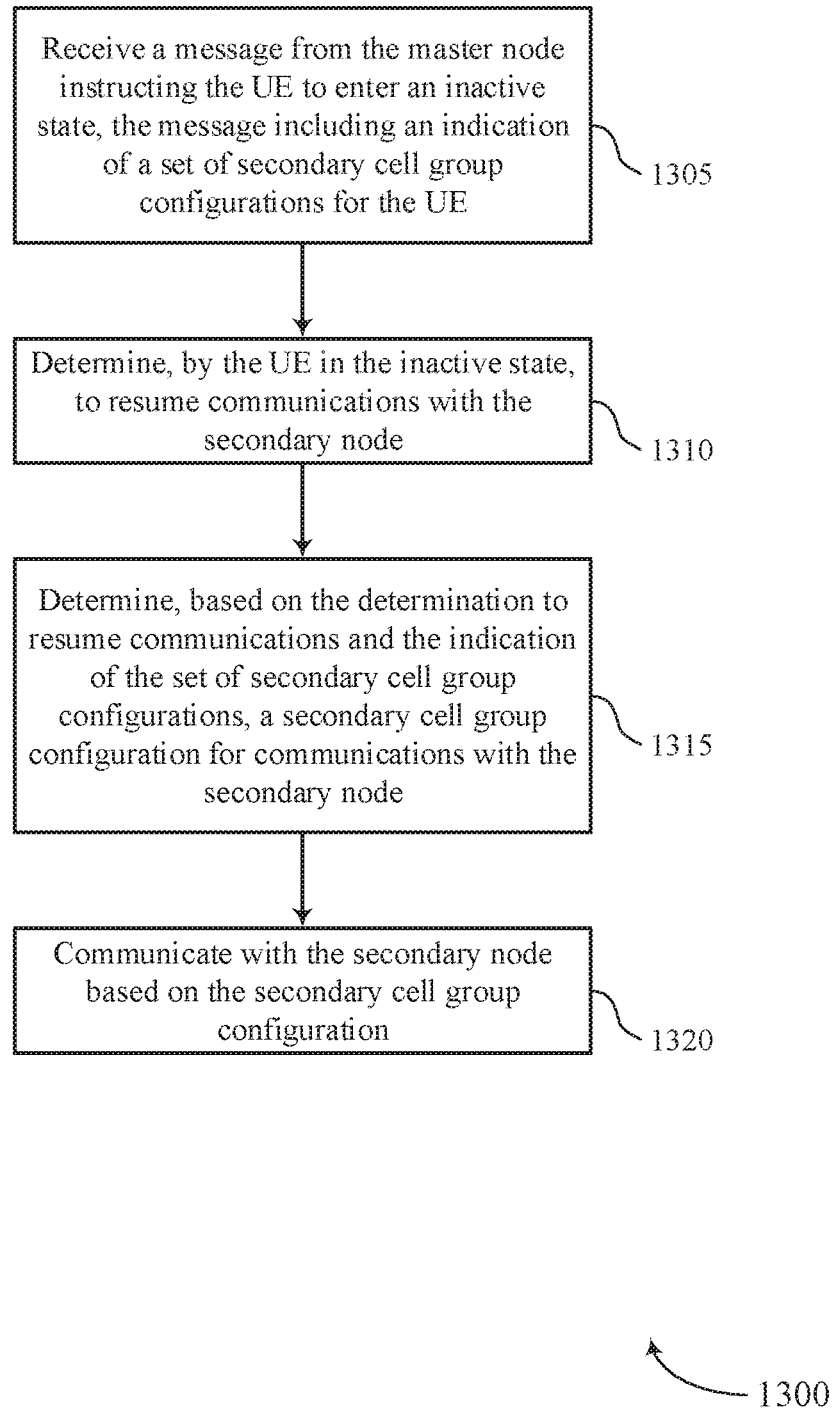
FIGS. 13 through 19 show flowcharts illustrating methods that support NR blind resume in accordance with aspects of the present disclosure.

FIG. 13 shows a flowchart illustrating a method 1300 that supports NR blind resume in accordance with aspects of the present disclosure. The operations of method 1300 may be implemented by a UE 115 or its components as described herein. For example, the operations of method 1300 may be performed by a blind resume manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive a message from the master node instructing the UE to enter an inactive state, the message including an indication of a set of secondary cell group configurations for the UE. The operations of 1305 may be performed according to the methods described herein. In some examples, aspects of the operations of 1305 may be performed by a message receiver as described with reference to FIGS. 5 through 8.

At 1310, the UE may determine, by the UE in the inactive state, to resume communications with the secondary node. The operations of 1310 may be performed according to the methods described herein. In some examples, aspects of the operations of 1310 may be performed by a resume component as described with reference to FIGS. 5 through 8.

At 1315, the UE may determine, based on the determination to resume communications and the indication of the set of secondary cell group configurations, a secondary cell group configuration for communications with the secondary node. The operations of 1315 may be performed according to the methods described herein. In some examples, aspects of the operations of 1315 may be performed by a SCG configuration manager as described with reference to FIGS. 5 through 8.

At 1320, the UE may communicate with the secondary node based on the secondary cell group configuration. The operations of 1320 may be performed according to the methods described herein. In some examples, aspects of the operations of 1320 may be performed by a communications component as described with reference to FIGS. 5 through 8.

Figure 14:
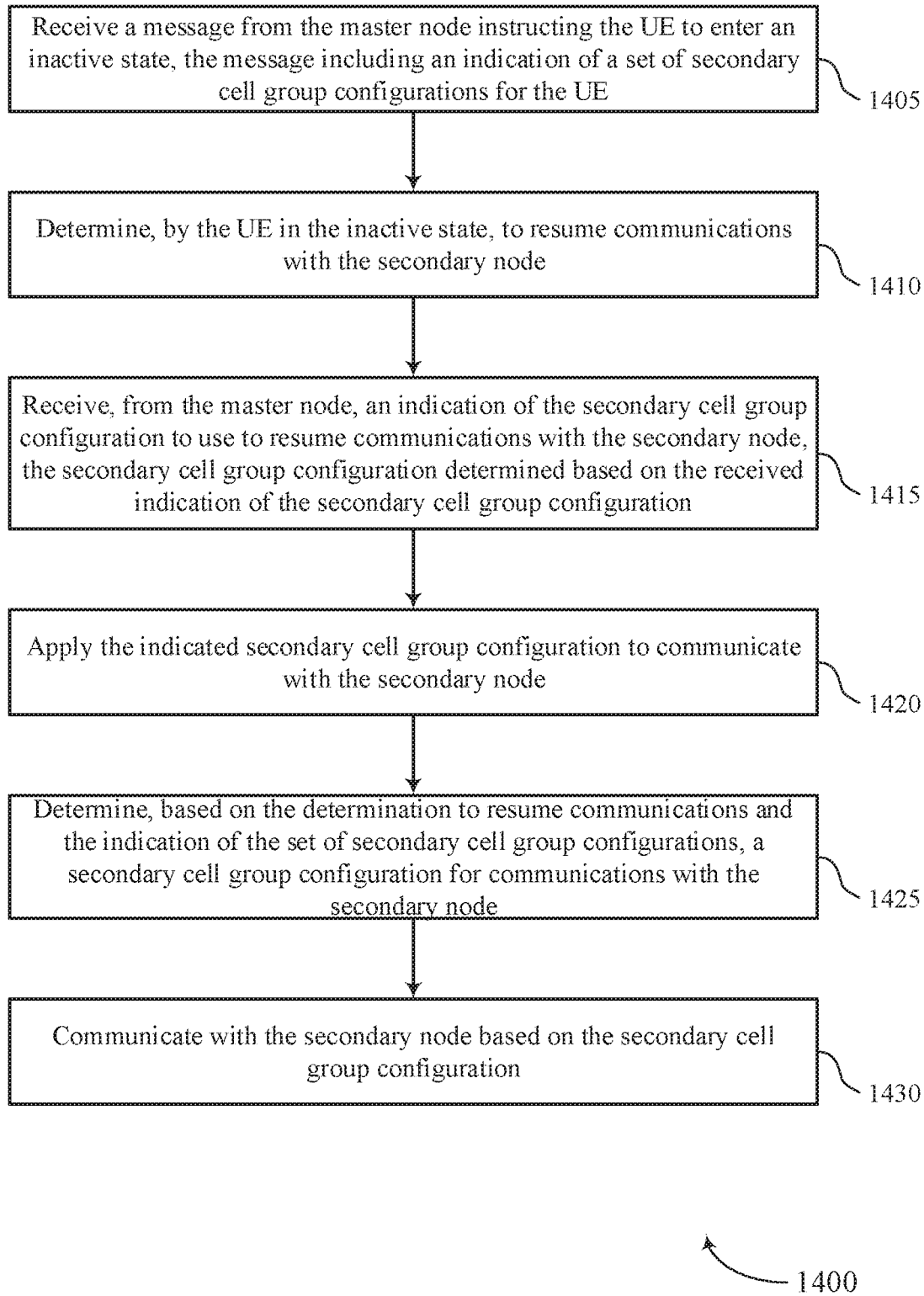

FIG. 14 shows a flowchart illustrating a method 1400 that supports NR blind resume in accordance with aspects of the present disclosure. The operations of method 1400 may be implemented by a UE 115 or its components as described herein. For example, the operations of method 1400 may be performed by a blind resume manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may receive a message from the master node instructing the UE to enter an inactive state, the message including an indication of a set of secondary cell group configurations for the UE. The operations of 1405 may be performed according to the methods described herein. In some examples, aspects of the operations of 1405 may be performed by a message receiver as described with reference to FIGS. 5 through 8.

At 1410, the UE may determine, by the UE in the inactive state, to resume communications with the secondary node. The operations of 1410 may be performed according to the methods described herein. In some examples, aspects of the operations of 1410 may be performed by a resume component as described with reference to FIGS. 5 through 8.

At 1415, the UE may receive, from the master node, an indication of the secondary cell group configuration to use to resume communications with the secondary node, the secondary cell group configuration determined based on the received indication of the secondary cell group configuration. The operations of 1415 may be performed according to the methods described herein. In some examples, aspects of the operations of 1415 may be performed by a SCG receiver as described with reference to FIGS. 5 through 8.

At 1420, the UE may apply the indicated secondary cell group configuration to communicate with the secondary node. The operations of 1420 may be performed according to the methods described herein. In some examples, aspects of the operations of 1420 may be performed by a SCG configuration manager as described with reference to FIGS. 5 through 8.

At 1425, the UE may determine, based on the determination to resume communications and the indication of the set of secondary cell group configurations, a secondary cell group configuration for communications with the secondary node. The operations of 1425 may be performed according to the methods described herein. In some examples, aspects of the operations of 1425 may be performed by a SCG configuration manager as described with reference to FIGS. 5 through 8.

At 1430, the UE may communicate with the secondary node based on the secondary cell group configuration. The operations of 1430 may be performed according to the methods described herein. In some examples, aspects of the operations of 1430 may be performed by a communications component as described with reference to FIGS. 5 through 8.

Figure 15:
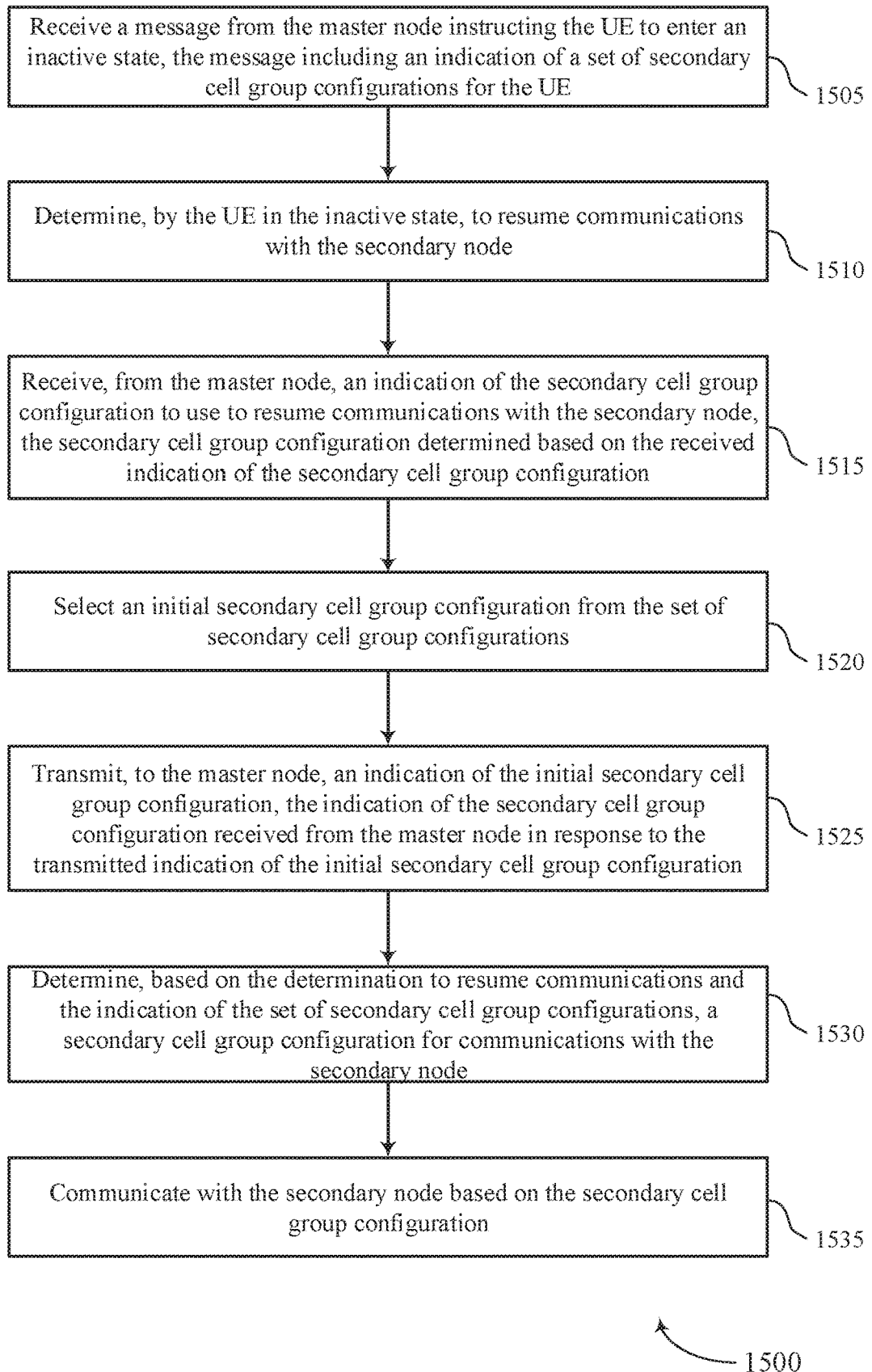

FIG. 15 shows a flowchart illustrating a method 1500 that supports NR blind resume in accordance with aspects of the present disclosure. The operations of method 1500 may be implemented by a UE 115 or its components as described herein. For example, the operations of method 1500 may be performed by a blind resume manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may receive a message from the master node instructing the UE to enter an inactive state, the message including an indication of a set of secondary cell group configurations for the UE. The operations of 1505 may be performed according to the methods described herein. In some examples, aspects of the operations of 1505 may be performed by a message receiver as described with reference to FIGS. 5 through 8.

At 1510, the UE may determine, by the UE in the inactive state, to resume communications with the secondary node. The operations of 1510 may be performed according to the methods described herein. In some examples, aspects of the operations of 1510 may be performed by a resume component as described with reference to FIGS. 5 through 8.

At 1515, the UE may receive, from the master node, an indication of the secondary cell group configuration to use to resume communications with the secondary node, the secondary cell group configuration determined based on the received indication of the secondary cell group configuration. The operations of 1515 may be performed according to the methods described herein. In some examples, aspects of the operations of 1515 may be performed by a SCG receiver as described with reference to FIGS. 5 through 8.

At 1520, the UE may select an initial secondary cell group configuration from the set of secondary cell group configurations. The operations of 1520 may be performed according to the methods described herein. In some examples, aspects of the operations of 1520 may be performed by a SCG selection module as described with reference to FIGS. 5 through 8.

At 1525, the UE may transmit, to the master node, an indication of the initial secondary cell group configuration, the indication of the secondary cell group configuration received from the master node in response to the transmitted indication of the initial secondary cell group configuration. The operations of 1525 may be performed according to the methods described herein. In some examples, aspects of the operations of 1525 may be performed by a transmission component as described with reference to FIGS. 5 through 8.

At 1530, the UE may determine, based on the determination to resume communications and the indication of the set of secondary cell group configurations, a secondary cell group configuration for communications with the secondary node. The operations of 1530 may be performed according to the methods described herein. In some examples, aspects of the operations of 1530 may be performed by a SCG configuration manager as described with reference to FIGS. 5 through 8.

At 1535, the UE may communicate with the secondary node based on the secondary cell group configuration. The operations of 1535 may be performed according to the methods described herein. In some examples, aspects of the operations of 1535 may be performed by a communications component as described with reference to FIGS. 5 through 8.

Figure 16:
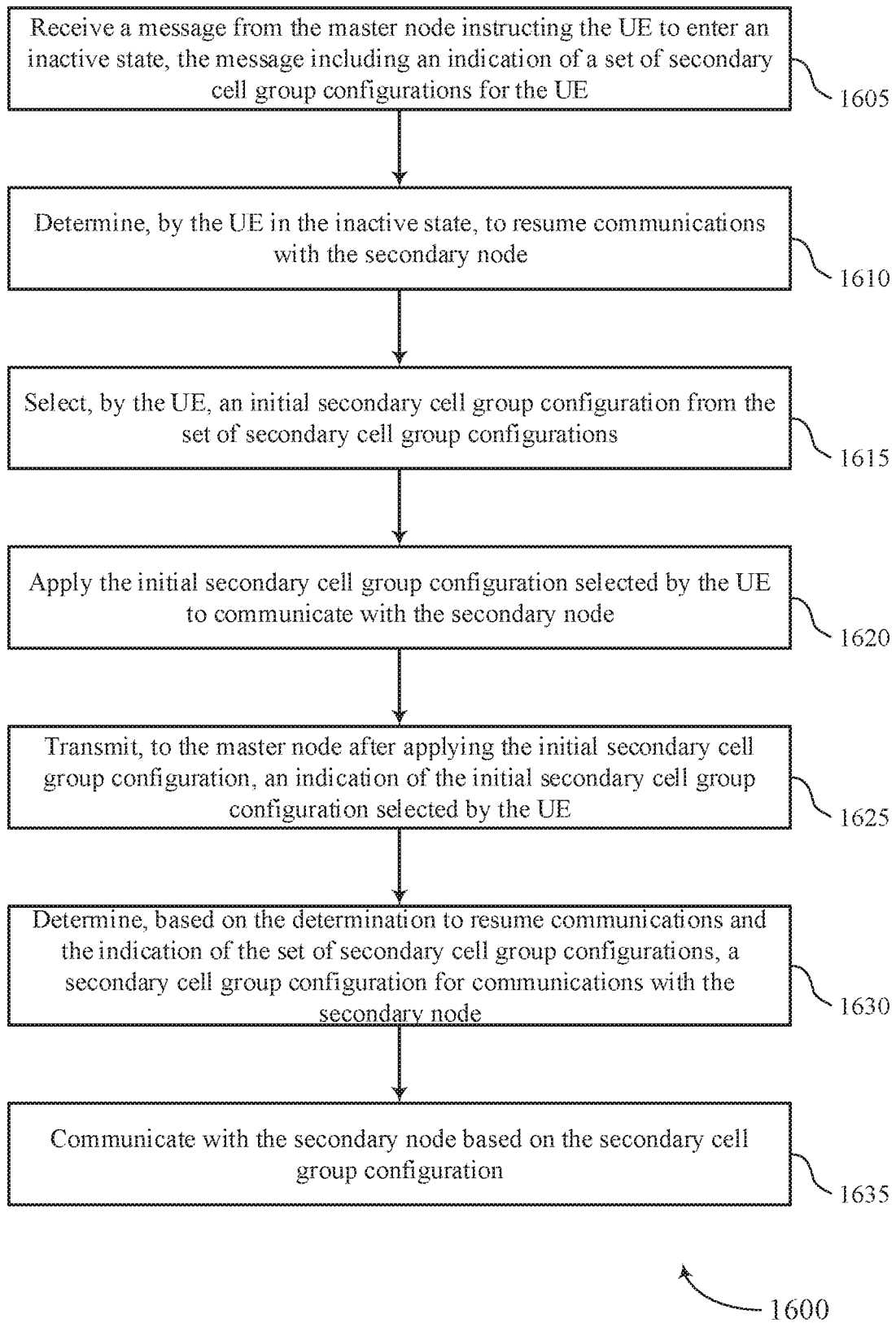

FIG. 16 shows a flowchart illustrating a method 1600 that supports NR blind resume in accordance with aspects of the present disclosure. The operations of method 1600 may be implemented by a UE 115 or its components as described herein. For example, the operations of method 1600 may be performed by a blind resume manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1605, the UE may receive a message from the master node instructing the UE to enter an inactive state, the message including an indication of a set of secondary cell group configurations for the UE. The operations of 1605 may be performed according to the methods described herein. In some examples, aspects of the operations of 1605 may be performed by a message receiver as described with reference to FIGS. 5 through 8.

At 1610, the UE may determine, by the UE in the inactive state, to resume communications with the secondary node. The operations of 1610 may be performed according to the methods described herein. In some examples, aspects of the operations of 1610 may be performed by a resume component as described with reference to FIGS. 5 through 8.

At 1615, the UE may select, by the UE, an initial secondary cell group configuration from the set of secondary cell group configurations. The operations of 1615 may be performed according to the methods described herein. In some examples, aspects of the operations of 1615 may be performed by a SCG selection module as described with reference to FIGS. 5 through 8.

At 1620, the UE may apply the initial secondary cell group configuration selected by the UE to communicate with the secondary node. The operations of 1620 may be performed according to the methods described herein. In some examples, aspects of the operations of 1620 may be performed by a SCG application component as described with reference to FIGS. 5 through 8.

At 1625, the UE may transmit, to the master node after applying the initial secondary cell group configuration, an indication of the initial secondary cell group configuration selected by the UE. The operations of 1625 may be performed according to the methods described herein. In some examples, aspects of the operations of 1625 may be performed by a transmission component as described with reference to FIGS. 5 through 8.

At 1630, the UE may determine, based on the determination to resume communications and the indication of the set of secondary cell group configurations, a secondary cell group configuration for communications with the secondary node. The operations of 1630 may be performed according to the methods described herein. In some examples, aspects of the operations of 1630 may be performed by a SCG configuration manager as described with reference to FIGS. 5 through 8.

At 1635, the UE may communicate with the secondary node based on the secondary cell group configuration. The operations of 1635 may be performed according to the methods described herein. In some examples, aspects of the operations of 1635 may be performed by a communications component as described with reference to FIGS. 5 through 8.

Figure 17:
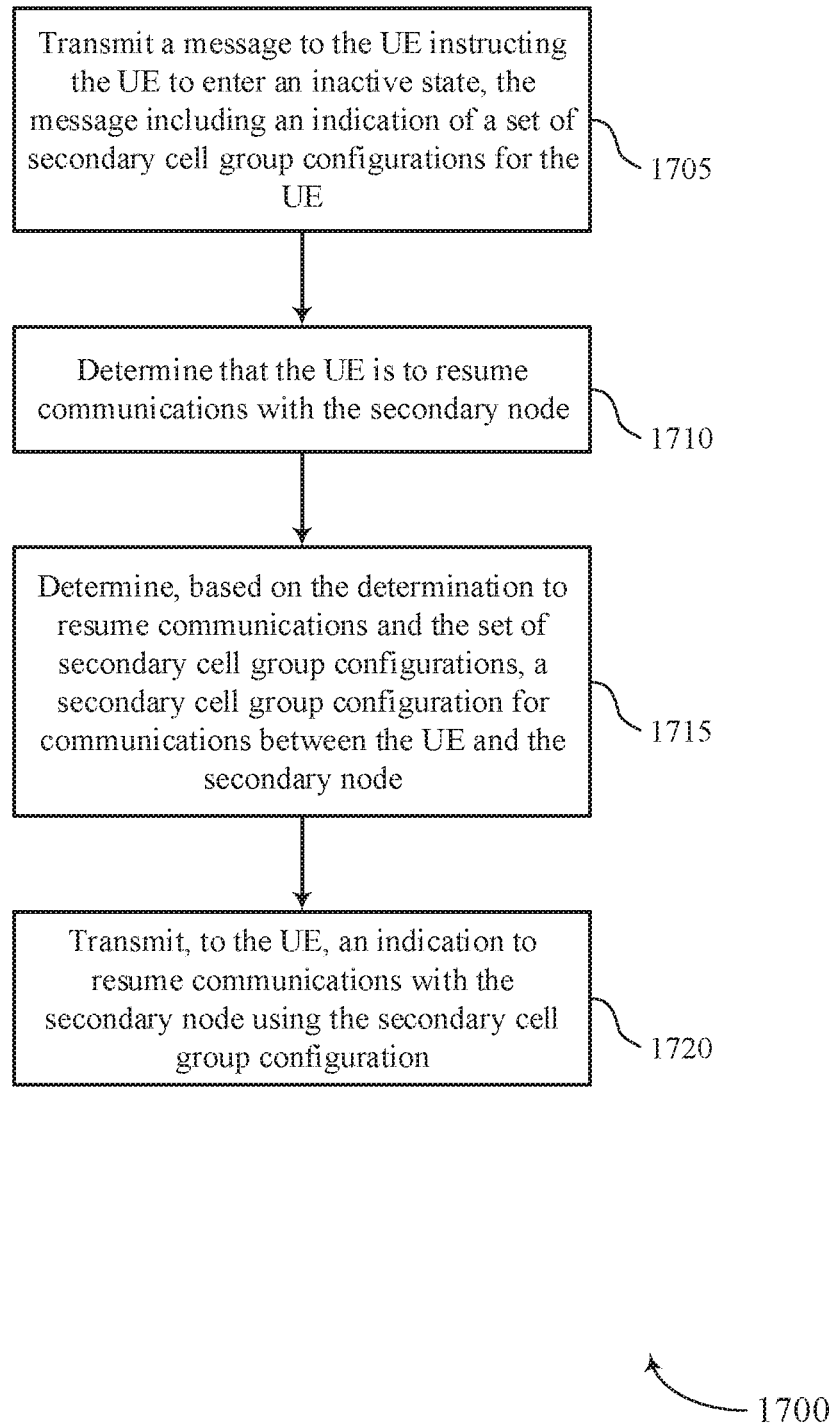

FIG. 17 shows a flowchart illustrating a method 1700 that supports NR blind resume in accordance with aspects of the present disclosure. The operations of method 1700 may be implemented by a base station 105 or its components as described herein. For example, the operations of method 1700 may be performed by a blind resume manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1705, the base station may transmit a message to the UE instructing the UE to enter an inactive state, the message including an indication of a set of secondary cell group configurations for the UE. The operations of 1705 may be performed according to the methods described herein. In some examples, aspects of the operations of 1705 may be performed by a message transmitter as described with reference to FIGS. 9 through 12.

At 1710, the base station may determine that the UE is to resume communications with the secondary node. The operations of 1710 may be performed according to the methods described herein. In some examples, aspects of the operations of 1710 may be performed by a resumption component as described with reference to FIGS. 9 through 12.

At 1715, the base station may determine, based on the determination to resume communications and the set of secondary cell group configurations, a secondary cell group configuration for communications between the UE and the secondary node. The operations of 1715 may be performed according to the methods described herein. In some examples, aspects of the operations of 1715 may be performed by a SCG determination manager as described with reference to FIGS. 9 through 12.

At 1720, the base station may transmit, to the UE, an indication to resume communications with the secondary node using the secondary cell group configuration. The operations of 1720 may be performed according to the methods described herein. In some examples, aspects of the operations of 1720 may be performed by an indication transmitter as described with reference to FIGS. 9 through 12.

Figure 18:
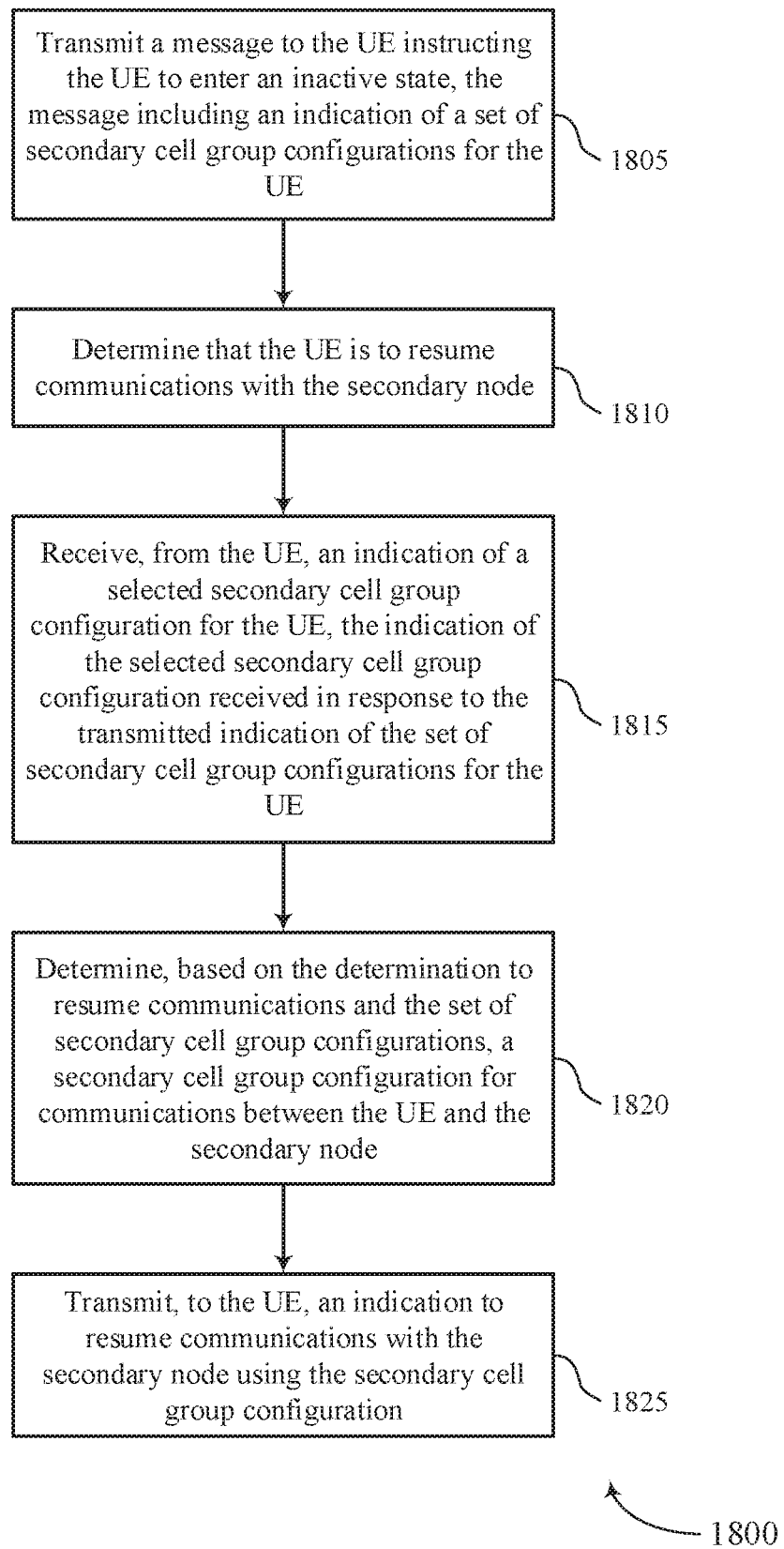

FIG. 18 shows a flowchart illustrating a method 1800 that supports NR blind resume in accordance with aspects of the present disclosure. The operations of method 1800 may be implemented by a base station 105 or its components as described herein. For example, the operations of method 1800 may be performed by a blind resume manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1805, the base station may transmit a message to the UE instructing the UE to enter an inactive state, the message including an indication of a set of secondary cell group configurations for the UE. The operations of 1805 may be performed according to the methods described herein. In some examples, aspects of the operations of 1805 may be performed by a message transmitter as described with reference to FIGS. 9 through 12.

At 1810, the base station may determine that the UE is to resume communications with the secondary node. The operations of 1810 may be performed according to the methods described herein. In some examples, aspects of the operations of 1810 may be performed by a resumption component as described with reference to FIGS. 9 through 12.

At 1815, the base station may receive, from the UE, an indication of a selected secondary cell group configuration for the UE, the indication of the selected secondary cell group configuration received in response to the transmitted indication of the set of secondary cell group configurations for the UE. The operations of 1815 may be performed according to the methods described herein. In some examples, aspects of the operations of 1815 may be performed by an indication receiver as described with reference to FIGS. 9 through 12.

At 1820, the base station may determine, based on the determination to resume communications and the set of secondary cell group configurations, a secondary cell group configuration for communications between the UE and the secondary node. The operations of 1820 may be performed according to the methods described herein. In some examples, aspects of the operations of 1820 may be performed by a SCG determination manager as described with reference to FIGS. 9 through 12.

At 1825, the base station may transmit, to the UE, an indication to resume communications with the secondary node using the secondary cell group configuration. The operations of 1825 may be performed according to the methods described herein. In some examples, aspects of the operations of 1825 may be performed by an indication transmitter as described with reference to FIGS. 9 through 12.

Figure 19:
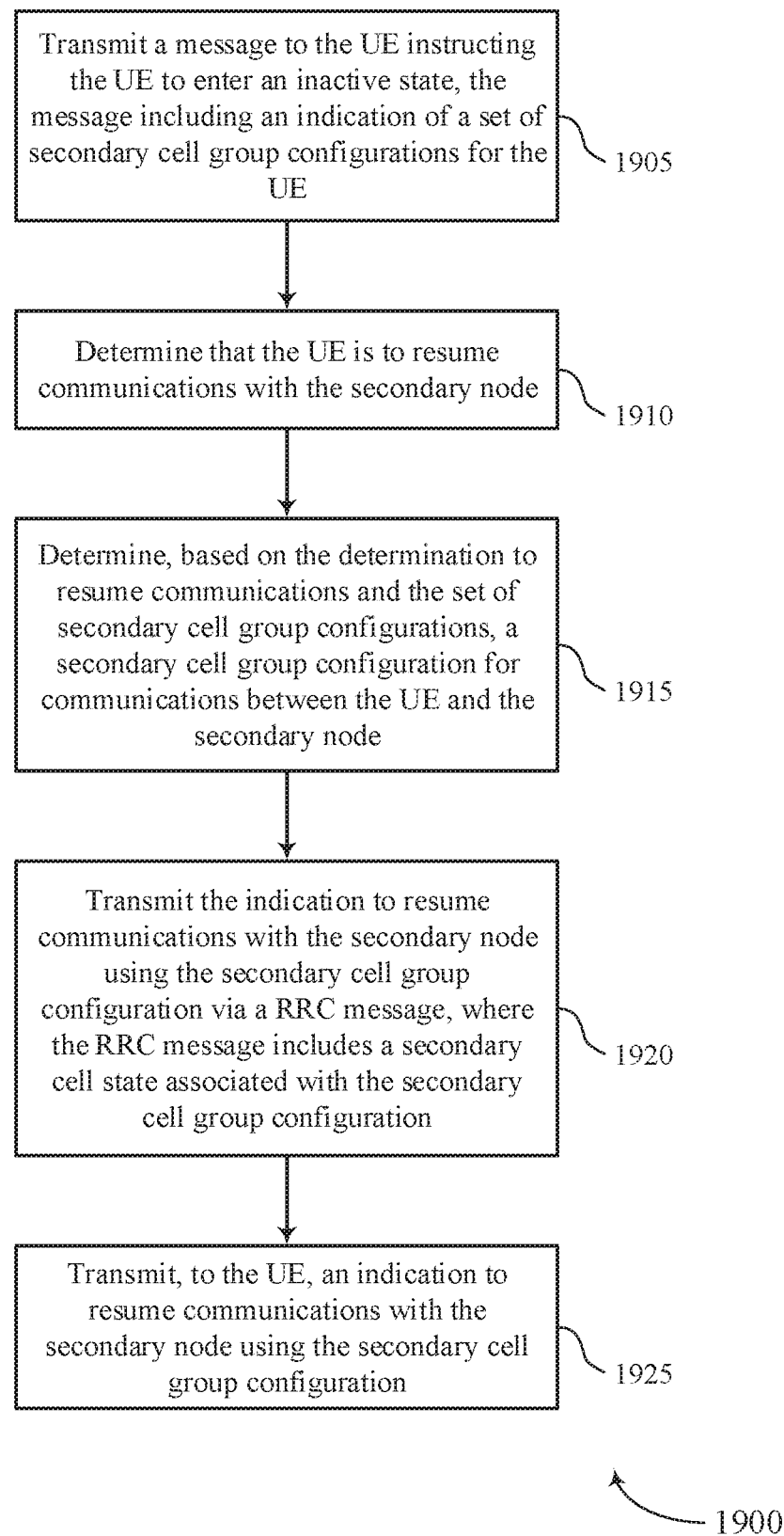

FIG. 19 shows a flowchart illustrating a method 1900 that supports NR blind resume in accordance with aspects of the present disclosure. The operations of method 1900 may be implemented by a base station 105 or its components as described herein. For example, the operations of method 1900 may be performed by a blind resume manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1905, the base station may transmit a message to the UE instructing the UE to enter an inactive state, the message including an indication of a set of secondary cell group configurations for the UE. The operations of 1905 may be performed according to the methods described herein. In some examples, aspects of the operations of 1905 may be performed by a message transmitter as described with reference to FIGS. 9 through 12.

At 1910, the base station may determine that the UE is to resume communications with the secondary node. The operations of 1910 may be performed according to the methods described herein. In some examples, aspects of the operations of 1910 may be performed by a resumption component as described with reference to FIGS. 9 through 12.

At 1915, the base station may determine, based on the determination to resume communications and the set of secondary cell group configurations, a secondary cell group configuration for communications between the UE and the secondary node. The operations of 1915 may be performed according to the methods described herein. In some examples, aspects of the operations of 1915 may be performed by a SCG determination manager as described with reference to FIGS. 9 through 12.

At 1920, the base station may transmit the indication to resume communications with the secondary node using the secondary cell group configuration via a RRC message, where the RRC message includes a secondary cell state associated with the secondary cell group configuration. The operations of 1920 may be performed according to the methods described herein. In some examples, aspects of the operations of 1920 may be performed by an indication transmitter as described with reference to FIGS. 9 through 12.

At 1925, the base station may transmit, to the UE, an indication to resume communications with the secondary node using the secondary cell group configuration. The operations of 1925 may be performed according to the methods described herein. In some examples, aspects of the operations of 1925 may be performed by an indication transmitter as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple CCs.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE) in a dual connectivity configuration with a master node and a secondary node, comprising:
   receiving a message from the master node instructing the UE to enter an inactive state;
   receiving, by the UE in the inactive state, an indication to resume communications with the secondary node;
   determining, based at least in part on receiving the indication to resume communications, a secondary cell group configuration for communications with the secondary node;
   transmitting, to the master node after applying the secondary cell group configuration, an indication of the secondary cell group configuration selected by the UE; and
   communicating with the secondary node based at least in part on the secondary cell group configuration.

2. The method of claim 1, further comprising:
   receiving, from the master node, an indication of the secondary cell group configuration to use to resume communications with the secondary node, the secondary cell group configuration determined based at least in part on the received indication of the secondary cell group configuration; and
   applying the secondary cell group configuration to communicate with the secondary node.

3. The method of claim 2, further comprising:
   selecting an initial secondary cell group configuration from a set of secondary cell group configurations; and
   transmitting, to the master node, an indication of the initial secondary cell group configuration, the indication of the secondary cell group configuration received from the master node in response to the transmitted indication of the initial secondary cell group configuration.

4. The method of claim 2, wherein the indication of the secondary cell group configuration is ciphered based at least in part on a security key generated using a Next Hop Chaining Counter (NCC) included in the message from the master node instructing the UE to enter the inactive state.

5. The method of claim 2, wherein receiving the indication to resume communications with the secondary node comprises:
   receiving an indication to use the secondary cell group configuration, wherein the indication to resume communications with the secondary node is received via a radio resource control (RRC) message, wherein the RRC message comprises a secondary cell state associated with the secondary cell group configuration.

6. The method of claim 5, wherein the secondary cell state comprises one of activated, deactivated, or dormant.

7. The method of claim 1, wherein the message from the master node instructing the UE to enter the inactive state comprises a radio resource control (RRC) release message.

8. The method of claim 1, wherein the message from the master node instructing the UE to enter the inactive state comprises a Next Hop Chaining Counter (NCC).

9. The method of claim 1, wherein the message from the master node instructing the UE to enter the inactive state comprises a reference signal received power threshold, a reference signal received quality threshold, or a combination thereof, for use by the UE to validate secondary cell group configurations upon resuming communications.

10. The method of claim 1, further comprising:
    selecting, by the UE, an initial secondary cell group configuration from a set of secondary cell group configurations, wherein applying the initial secondary cell group configuration is based at least in part on the selecting.

11. The method of claim 10, further comprising:
    receiving, from the master node, an indication of the secondary cell group configuration to use to resume communications with the secondary node, wherein the secondary cell group configuration is a different configuration than the initial secondary cell group configuration; and
    configuring the UE according to the secondary cell group configuration different than the initial secondary cell group configuration.

12. The method of claim 10, further comprising:
    receiving, from the master node, an indication of the secondary cell group configuration to use to resume communications with the secondary node, wherein the secondary cell group configuration is a same configuration as the initial secondary cell group configuration.

13. The method of claim 12, further comprising:
    receiving, based at least in part on the secondary cell group configuration being the same configuration as the initial secondary cell group configuration, data for the UE together with the indication of the secondary cell group configuration.

14. The method of claim 10, wherein the indication of the secondary cell group configuration is ciphered with a security key generated based at least in part on a Next Hop Chaining Counter (NCC) included in the message from the master node instructing the UE to enter the inactive state.

15. The method of claim 1, further comprising:
    measuring, based at least in part on a set of secondary cell group configurations, signaling from at least one secondary node after determining to resume communications with the secondary node, the secondary cell group configuration determined based at least in part on the measuring.

16. The method of claim 15, further comprising:
measuring a reference signal received power, a reference signal received quality, or a combination thereof, of the signaling.

17. The method of claim 1, further comprising:
storing a set of higher layer secondary cell group configurations and a corresponding set of lower layer secondary cell group configurations based at least in part on a set of secondary cell group configurations.

18. The method of claim 1, further comprising:
discarding a set of secondary cell group configurations based at least in part on the secondary cell group configuration being different than all secondary cell group configurations of the set of secondary cell group configurations.

19. The method of claim 1, further comprising:
performing a random access procedure with the secondary node based at least in part on the secondary cell group configuration, wherein communicating with the secondary node is based at least in part on the performed random access procedure.

20. A method for wireless communications at a master node in a dual connectivity configuration with a user equipment (UE) and a secondary node, comprising:
transmitting a message to the UE instructing the UE to enter an inactive state;
determining that the UE is to resume communications with the secondary node;
determining, based at least in part on the determination to resume communications and a set of secondary cell group configurations, a secondary cell group configuration for communications between the UE and the secondary node;
receiving, from the UE, an indication of the secondary cell group configuration applied by the UE; and
transmitting, to the UE, an indication to resume communications with the secondary node using the secondary cell group configuration.

21. The method of claim 20, further comprising:
receiving, from the UE, an indication of a selected secondary cell group configuration for the UE.

22. The method of claim 21, wherein the indication of the selected secondary cell group configuration is ciphered with a security key generated based at least in part on a Next Hop Chaining Counter (NCC) included in the message to the UE instructing the UE to enter the inactive state.

23. The method of claim 20, wherein the message transmitted to the UE instructing the UE to enter the inactive state comprises a radio resource control (RRC) release message.

24. The method of claim 20, wherein the message transmitted to the UE instructing the UE to enter the inactive state comprises a Next Hop Chaining Counter (NCC) and the indication to resume communications is ciphered with a security key generated based at least in part on the NCC.

25. The method of claim 20, wherein the message transmitted to the UE instructing the UE to enter the inactive state comprises a reference signal received power threshold, a reference signal received quality threshold, or a combination thereof, for use by the UE to validate secondary cell group configurations upon resuming communications.

26. The method of claim 20, wherein the indication to resume communications with the secondary node using the secondary cell group configuration is transmitted via a radio resource control (RRC) message, wherein the RRC message comprises a secondary cell state associated with the secondary cell group configuration.

27. The method of claim 26, wherein the secondary cell state comprises one of activated, deactivated, or dormant.

28. The method of claim 21, wherein the indication of a selected secondary cell group configuration applied by the UE is ciphered based at least in part on a security key generated using a Next Hop Chaining Counter (NCC) included in the message to the UE instructing the UE to enter the inactive state.

29. The method of claim 21, further comprising:
transmitting, to the UE, an indication of the secondary cell group configuration to use to resume communications with the secondary node, wherein the secondary cell group configuration is a different configuration than a selected secondary cell group configuration.

30. The method of claim 21, further comprising:
transmitting, to the UE, an indication of the secondary cell group configuration to use to resume communications with the secondary node, wherein the secondary cell group configuration is a same configuration as a selected secondary cell group configuration.

31. The method of claim 30, further comprising:
transmitting, based at least in part on the secondary cell group configuration being the same configuration as the selected secondary cell group configuration, data for the UE together with the indication of the secondary cell group configuration.

32. An apparatus for wireless communications at a user equipment (UE) in a dual connectivity configuration with a master node and a secondary node, comprising:
at least one processor; and
at least one memory coupled with the at least one processor, with instructions stored in the at least one memory, the instructions being executable by the at least one processor, individually or in any combination, to cause the apparatus to:
receive a message from the master node instructing the UE to enter an inactive state;
receive, by the UE in the inactive state, an indication to resume communications with the secondary node;
determine, based at least in part on receiving the indication to resume communications, a secondary cell group configuration for communications with the secondary node;
transmit, to the master node after applying the secondary cell group configuration, an indication of the secondary cell group configuration selected by the UE; and
communicate with the secondary node based at least in part on the secondary cell group configuration.

33. An apparatus for wireless communications at a master node in a dual connectivity configuration with a user equipment (UE) and a secondary node, comprising:
at least one processor; and
at least one memory coupled with the at least one processor, with instructions stored in the at least one memory, the instructions being executable by the at least one processor, individually or in any combination, to cause the apparatus to:
transmit a message to the UE instructing the UE to enter an inactive state;
determine that the UE is to resume communications with the secondary node;
determine, based at least in part on the determination to resume communications and a set of secondary cell group configurations, a secondary cell group configuration for communications between the UE and the secondary node;
receive, from the UE, an indication of the secondary cell group configuration applied by the UE; and
transmit, to the UE, an indication to resume communications with the secondary node using the secondary cell group configuration.

34. An apparatus for wireless communications at a user equipment (UE) in a dual connectivity configuration with a master node and a secondary node, comprising:
means for receiving a message from the master node instructing the UE to enter an inactive state;
means for receiving, by the UE in the inactive state, an indication to resume communications with the secondary node;
means for determining, based at least in part on receiving the indication to resume communications, a secondary cell group configuration for communications with the secondary node;
means for transmitting, to the master node after applying the secondary cell group configuration, an indication of the secondary cell group configuration selected by the UE; and
means for communicating with the secondary node based at least in part on the secondary cell group configuration.

* * * * *